US012664268B2

(12) United States Patent
Grobman et al.

(10) Patent No.: US 12,664,268 B2
(45) Date of Patent: Jun. 23, 2026

(54) METHODS AND APPARATUS TO IDENTIFY STRUCTURAL SIMILARITY BETWEEN WEBPAGES

(71) Applicant: McAfee, LLC, San Jose, CA (US)

(72) Inventors: Steven L. Grobman, El Dorado Hills, CA (US); John Anthony Rivera, Woodbury, MN (US); Jonathan B. King, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 246 days.

(21) Appl. No.: 18/481,889

(22) Filed: Oct. 5, 2023

(65) Prior Publication Data

US 2025/0117476 A1 Apr. 10, 2025

(51) Int. Cl.
*G06F 21/55* (2013.01)
(52) U.S. Cl.
CPC ...... *G06F 21/554* (2013.01); *G06F 2221/033* (2013.01)
(58) Field of Classification Search
CPC ................................................. G06F 2221/033
See application file for complete search history.

(56) References Cited

U.S. PATENT DOCUMENTS

| | | | |
|---|---|---|---|
| 8,943,588 B1 * | 1/2015 | Speegle | H04L 63/1416 726/22 |
| 2014/0359760 A1 * | 12/2014 | Gupta | H04L 63/1483 726/22 |
| 2018/0103043 A1 * | 4/2018 | Kupreev | H04L 63/1483 |
| 2019/0066009 A1 * | 2/2019 | Lin | G06Q 30/0269 |
| 2019/0173894 A1 * | 6/2019 | Hunt | G06F 21/645 |

* cited by examiner

*Primary Examiner* — Amie C. Lin
(74) *Attorney, Agent, or Firm* — Hanley, Flight & Zimmerman, LLC

(57) ABSTRACT

Systems, apparatus, articles of manufacture, and methods are disclosed. An example apparatus includes interface circuitry; machine readable instructions; and programmable circuitry to at least one of instantiate or execute the machine readable instructions to: remove content data from a file corresponding to a first webpage, the file to include structure determiners after the removal of the content data; normalize data within the structure determiners; group the normalized structure determiners into tiles; compute a first output of a hashing algorithm using the tiles; and compare the first output to a second output of the hashing algorithm to generate a similarity value, the second output corresponding to a second webpage, the similarity value representing a structural similarity between the first webpage and the second webpage.

20 Claims, 13 Drawing Sheets

502

```
<html>
<head> header metadata, CSS includes, JS includes, page title, etc.  </head>
<body>
page contents <p> lorem ipsum, click <a href= webpage_domain_URL > here </a>. </p>
</body>
</html>
```

BEFORE CONTENT REMOVAL AND TOKEN NORMALIZATION

504

```
<html>
<head> </head>
<body>
<p> <a href= NORMALIZED> </a> </p>
</body>
</html>
```

AFTER CONTENT REMOVAL AND TOKEN NORMALIZATION

604

706

ANALYZE STRUCTURAL SIMILARITY
BETWEEN THE FIRST WEBPAGE
AND THE SECOND WEBPAGE

802

YES

ARE THE FIRST WEBPAGE AND THE SECOND
WEBPAGE BOTH HASHED?

NO

804

REMOVE CONTENT DATA FROM WEBPAGE FILE

806

NORMALIZE DATA WITHIN THE STRUCTURE IDENTIFIERS

808

TILE THE TOKENS REMAINNG IN THE FILE

810

COMPUTE A MINHASH OF THE TILES

812

COMPUTE A DIFFERENCE BETWEEN MINHASHES

RETURN

METHODS AND APPARATUS TO IDENTIFY STRUCTURAL SIMILARITY BETWEEN WEBPAGES

FIELD OF THE DISCLOSURE

This disclosure relates generally to cybersecurity and, more particularly, to methods and apparatus to identify structural similarity between webpages.

BACKGROUND

Malware is software that enables unauthorized access to networks for purposes of theft, sabotage, or espionage. In recent years, malware attacks have become increasingly diverse and complex. Computer security software companies are incentivized to produce malware identification software, which may be used by other businesses or general consumers to protect their systems and data.

BRIEF DESCRIPTION OF THE DRAWINGS

In general, the same reference numbers will be used throughout the drawing(s) and accompanying written description to refer to the same or like parts. The figures are not necessarily scaled.

Figure 1:
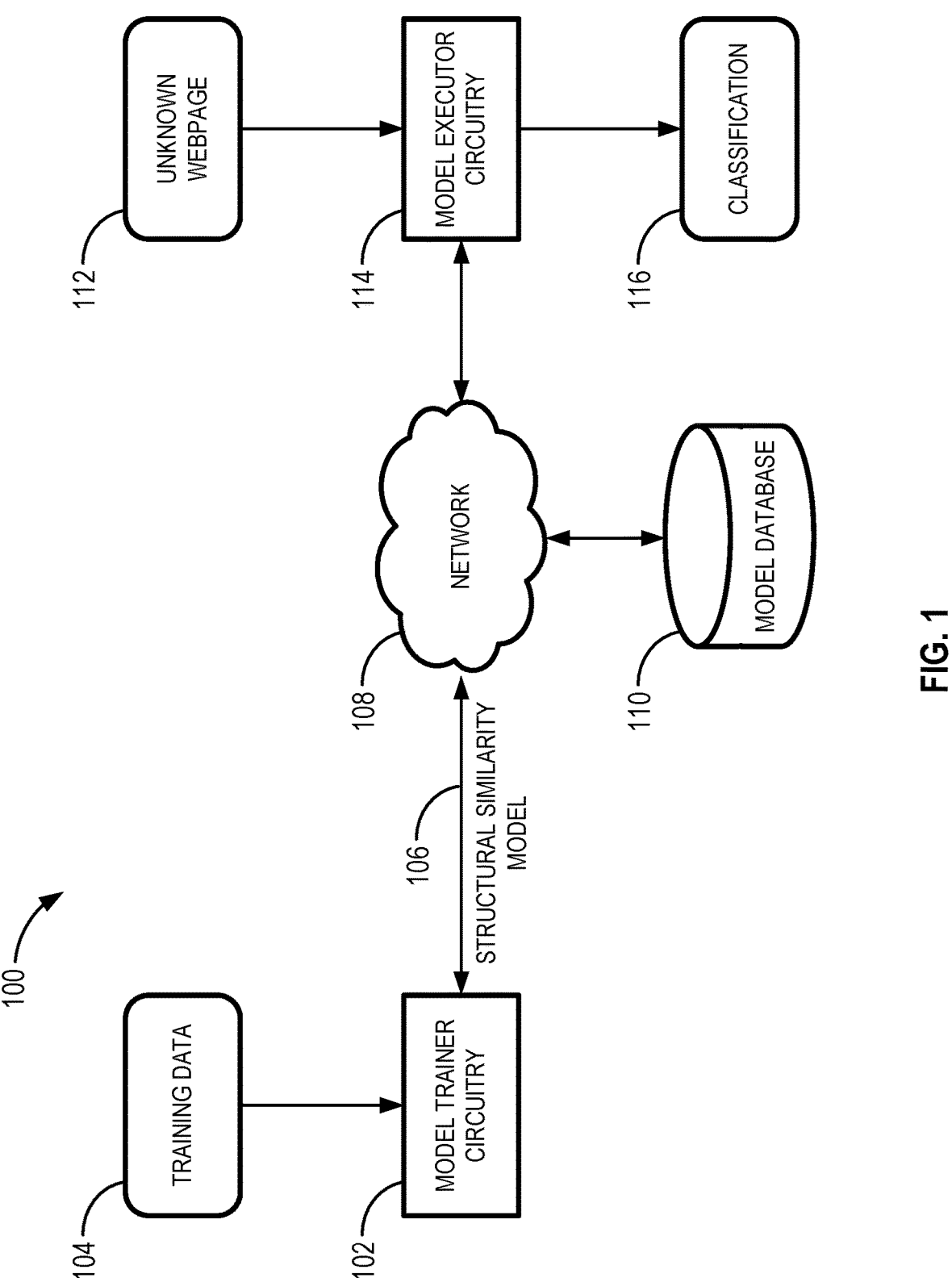
FIG. 1 is a block diagram of an example system to determine webpage structural similarity for malware classification.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein, integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

Examples described herein refer to text written in hypertext markup language (HTML), including but not limited to HTML tags, hyperlinks, and more generally, snippets of HTML code. The snippets of HTML code are used merely as examples to the disclosure provided herein. This disclosure is not intended to contain any active links or forms of browser executable code.

DETAILED DESCRIPTION

Malware programs may gain unauthorized access to a device in a variety of techniques. In many examples, malware is a webpage that steals private information or enables unauthorized access to a device once a user interacts with the webpage (e.g., click a link on the webpage, submit a form on the webpage, download a file from the webpage, etc.). Malicious actors may reference any type of content to make the malware appear legitimate and trick users into interacting with the webpage. For example, the webpage may reference a trusted official, a trusted organization, different current events, etc.

Some malicious webpages reference different content but share similar structures. For example, when a cryptocurrency exchange collapsed in November of 2022, malicious actors published webpages that attempted to lure cryptocurrency customers into providing their account information. The cryptocurrency scam webpages were structurally identical to a previous set of malicious webpages that attempted to obtain account information by referencing a celebrity business owner. That is, the cryptocurrency scam webpages and the celebrity business owner scam webpages had the same order of paragraphs, images, text input fields, but referenced different subject matter and targeted different account holders.

The foregoing example is one use case of malicious webpages that reference different content but share similar structures. In general, a malicious actor may re-use some or all of a webpage structure so that new malware can be quickly created and distributed by simply changing the content between webpages.

Example methods, apparatus, and systems described herein perform malware classification based on the structural similarity of webpages. Example model trainer circuitry creates a file that describes the contents of a webpage known to be clean or malicious. The model trainer circuitry then removes all the data from the file except for structure determiners, assigns tokens to the structure determiners, tiles the structure determiners, and uses the tiles as inputs to a hashing algorithm. Example model executor circuitry also performs the foregoing operations on an unknown webpage. The difference between the hashing algorithm output for the known webpage and the hashing algorithm output for the unknown webpage may be referred to as a structural similarity score. Example classifier circuitry then uses the structural similarity score as an input to determine whether the unknown webpage is clean or malicious. Advantageously, the example classifier circuitry is able to correctly classify the unknown webpage as clean or malicious more accurately than other malware classification techniques that do not consider webpage structure similarity.

FIG. 1 is a block diagram of an example system 100 to determine webpage structural similarity for malware classification. The example system 100 includes example model trainer circuitry 102, training data 104, an example structural similarity model 106, an example network 108, an example model database 110, example unknown webpage 112, example model executor circuitry 114, and example classification 116.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

The model trainer circuitry 102 is used to train the structural similarity model 106 to operate in accordance with patterns and/or associations based on, for example, training data 104. The structural similarity model 106 includes internal parameters that guide how input data is transformed into output data, such as through a series of nodes and connections within the model to transform input data into output data. Additionally, hyperparameters may be used as part of the training process to control how the learning is performed (e.g., a learning rate, a number of layers to be used in the machine learning model, etc.). Hyperparameters are defined to be training parameters that are determined prior to initiating the training process.

Many different types of machine learning models and/or machine learning architectures exist. In examples described herein, the model trainer circuitry 102 uses a deep learning model. A deep learning model enables the model trainer circuitry 102 to consider multiple inputs, including but not limited to structural similarity scores, when training or improving the structural similarity model 106. In other examples, the model trainer circuitry 102 may use other types of machine learning models such as a rules based heuristic algorithm.

Different types of training may be performed based on the ML/AI architecture and/or the expected output of the structural similarity model 106. For example, supervised training uses inputs and corresponding expected (e.g., labeled) outputs to select parameters (e.g., by iterating over combinations of select parameters) for the ML/AI model that reduce model error. As used herein, the terms "labelled" and "classified" may be used interchangeably to refer to an expected output of the machine learning model. Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In general, the machine learning models, architectures, and/or types are implemented in a training algorithm. In the structural similarity model 106, the training algorithm may be stochastic gradient descent. However, any other training algorithm may additionally or alternatively be used. In examples disclosed herein, the model trainer circuitry 102 implements the training algorithm until the error rate in webpage classification satisfies a threshold. In FIG. 1, the model trainer circuitry 102 is illustrated on a separate machine from the model executor circuitry 114. The separate machine may be hosted remotely at a central facility. In some examples, the model trainer circuitry 102 may be implemented on the same machine as the model executor circuitry 114. In some such examples, the machine may be an edge device.

The model trainer circuitry 102 may implement the training algorithm using hyperparameters that control how the learning is performed (e.g., a learning rate, a number of layers to be used in the machine learning model, etc.). In some examples, retraining may be performed. Such retraining may be performed in response to a change in the classification error rate of unknown webpages. In some examples, the unknown webpages may be referred to as unlabeled webpages.

The model trainer circuitry 102 implements the training algorithm using training data 104. In examples disclosed herein, the training data 104 may be publicly available or may be locally generated. Because supervised training is used, the training data 104 is labeled. Labeling may be applied to the training data 104 manually. Additionally or alternatively, labeling may be applied using historical data from an example computer security company utilizing example structure similarity values for webpage classification as described herein. In examples disclosed herein, the training data 104 is sub-divided into webpages classified as clean and webpages classified as malicious. The example model trainer circuitry 102 is explored further in FIG. 2.

The network 108 of FIG. 1 connects and facilitates communication between the model trainer circuitry 102, the model database 110, and the model executor circuitry 114. In this example, the network 108 is the Internet. However, the network 108 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The model database 110 of FIG. 1 stores one or more versions of the example structural similarity model 106. The model database 110 is implemented by any memory, storage device and/or storage disc for storing data such as, for example, flash memory, magnetic media, optical media, solid state memory, hard drive(s), thumb drive(s), etc. Furthermore, the data stored in the model database 110 may be in any data format such as, for example, binary data, comma delimited data, tab delimited data, structured query language (SQL) structures, etc. While, in the illustrated example, the model database 110 is illustrated as a single device, the model database 110 and/or any other data storage devices described herein may be implemented by any number and/or type(s) of memories.

The model executor circuitry 114 accesses the structural similarity model 106 from the model database 110 via the network 108. The model executor circuitry operates the structure similarity model in an inference phase to process data. In the inference phase, the unknown webpage 112 (e.g., live data) is input to the structural similarity model 106, and the structural similarity model 106 executes to output data. The output data of the model executor circuitry 114 is the classification 116, which is associated with the unknown webpage 112 and describes whether the unknown webpage 112 is clean or malicious. This inference phase can be thought of as the AI "thinking" to generate the output based on what it learned from the training (e.g., by executing the model to apply the learned patterns and/or associations to the live data). In some examples, input data undergoes pre-processing before being used as an input to the structural similarity model 106. Moreover, in some examples, the output data may undergo post-processing after it is generated by the structural similarity model 106 to mitigate malicious activities.

In some examples, output of the deployed model may be captured and provided as feedback to the example model trainer circuitry 102 via the network. By analyzing the feedback, an accuracy of the example structural similarity model 106 can be determined. If the feedback indicates that the accuracy of the example structural similarity model 106 fails to satisfy a threshold or other criterion, training of an updated model can be triggered using the feedback and an updated training data set, hyperparameters, etc., to generate an updated, deployed model.

The example system 100 of FIG. 1 produces an example structure similarity model 106 that is used to classify the unknown webpage 112 as clean or malicious. The webpage classification may then be used to mitigate malicious activity. Advantageously, the structural similarity model 106 considers the tendency of some malicious actors to re-use webpage structures as a factor when classifying the unknown webpage 112. Accordingly, the structural similarity model 106 can correctly classify the unknown webpage 112 as clean or malicious more accurately than other malware classification techniques that do not consider webpage structure similarity.

Examples described above and herein use the term "webpages" (e.g., individual documents on the Internet that each have a unique uniform resource link (URL)) when referring to the classification performed in the system 100.

In some examples, the term "websites" (e.g., a collection of two or more webpages that relate to one another) is additionally or alternatively used when referring to the classification performed in the system 100.

Figure 2:
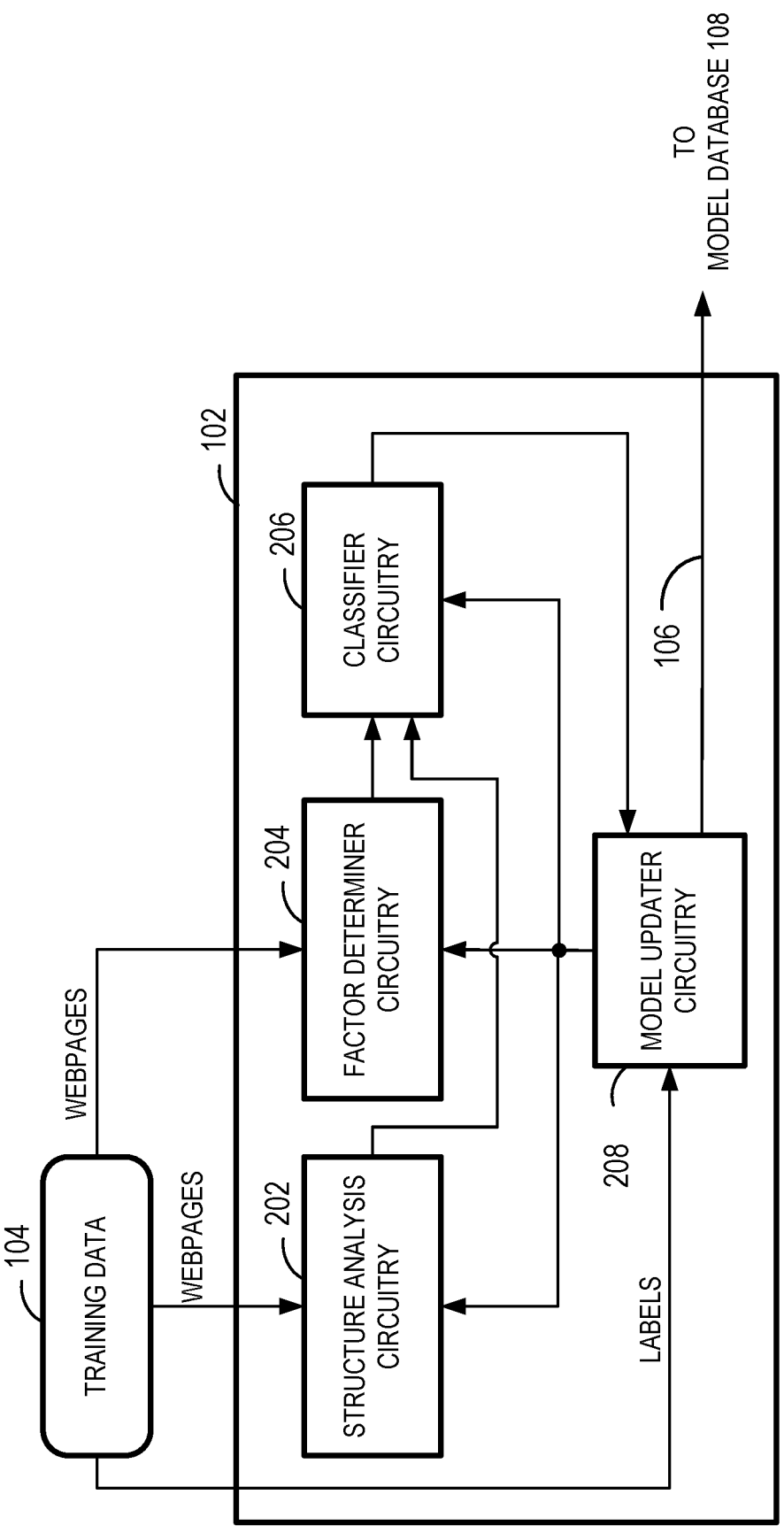
FIG. 2 is a block diagram of an example implementation of the model trainer circuitry of FIG. 1.

FIG. 2 is a block diagram of an example implementation of the model trainer circuitry 102 of FIG. 1 to produce the structural similarity model 106. The model trainer circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the model trainer circuitry 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers. The example model trainer circuitry 102 of FIG. 2 includes example structure analysis circuitry 202, example factor determiner circuitry 204, example classifier circuitry 206, and example model updater circuitry 208.

The structure analysis circuitry 202 produces a structure similarity score in accordance with the teachings of this disclosure. As used above and herein, a structure similarity score refers to a value that quantifies how similar the structure of two webpages are. In the example of FIG. 2, the structure analysis circuitry 202 obtains both webpages from the labelled training data 104. In other examples, the structure analysis circuitry 202 uses one or more unknown webpages as inputs. The structure similarity score may be implemented using any type of value. Examples of values include but are not limited to floating points, integers, letter grades, etc.

Figure 3:
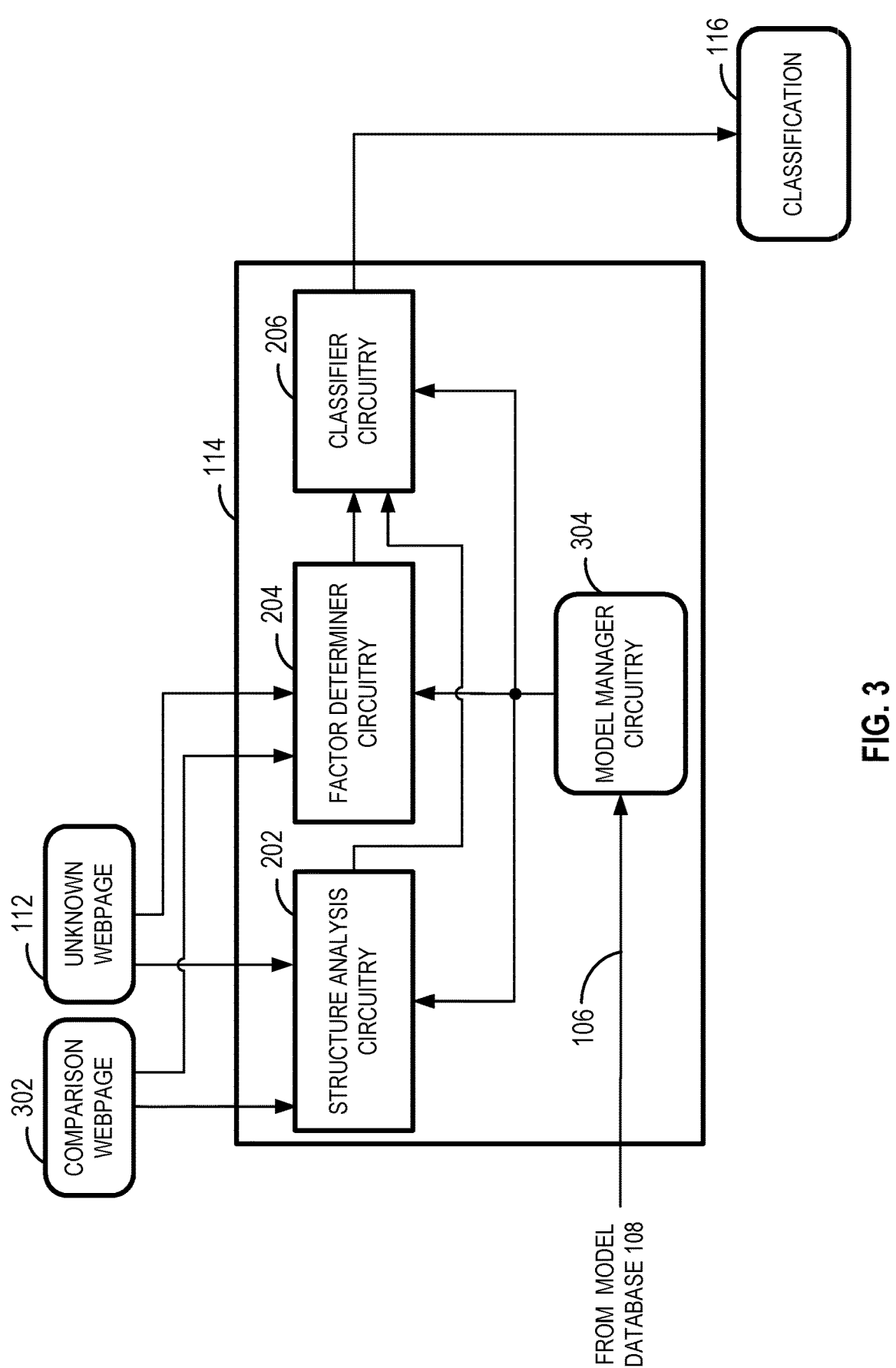
FIG. 3 is a block diagram of an example implementation of the model executor circuitry of FIG. 1.

The techniques used by the structure analysis circuitry 202 to produce structure similarity scores are discussed further in connection with FIGS. 3 and 5. In some examples, the structure analysis circuitry 202 is instantiated by programmable circuitry executing structure analysis instructions and/or configured to perform operations such as those represented by the flowcharts of FIGS. 6-8.

The factor determiner circuitry 204 identifies factors other than structure similarity scores that may be used to classify a webpage as clean or malicious. Examples of factors identified by the factor determiner circuitry 204 include but are not limited to length of the webpage, a categorization of the content described by the webpage, the length of the URL, the presence of red flag terms in the webpage, the source of the webpage, actions performed by a browser application when visiting the webpage, etc. As used herein, categorization refers to the labelling of a webpage based on its content. Examples of webpage categories may include but are not limited to business, shopping/merchandise, education, gaming, video streaming, etc. In some examples, the factor determiner circuitry 204 identifies (a) configuration parameters of the device visiting the webpage and/or (b) profile instructions of a user visiting the webpage, as factors that are useful for malware classification of websites. In some examples, the factor determiner circuitry 204 is instantiated by programmable circuitry executing characteristic determiner instructions and/or configured to perform operations such as those represented by the flowcharts of FIGS. 6-8.

The classifier circuitry 206 classifies the webpage as clean or malicious based on at least the structure similarity score. While examples described herein refer to the classifier circuitry 206 as a binary classifier (e.g., producing an output of either clean or malicious), in other examples, the classifier circuitry 206 chooses one of any number of classifications to characterize the webpage. Additional classifications may include but are not limited to: use caution, secure, requires human review, etc.

The classifier circuitry 206 may also consider additional factors provided by the factor determiner circuitry 204 when classifying the webpage. In some examples, the classifier circuitry 206 implements a neural network to accurately map inputs (e.g., the structure similarity score and other factors) to an output (e.g., clean or malicious). In such examples, the classifier circuitry 206 may use any number of total factors as inputs to the neural network. The neural network may have any number of hidden layers and the structural similarity score may be weighed in any manner (e.g., the structural similarity score may be considered either less or more important than other inputs to the neural network). In other examples, the classifier circuitry 206 implements a different type of classification technique. The classifier circuitry 206 may be instantiated by programmable circuitry executing classifier instructions and/or configured to perform operations such as those represented by the flowcharts of FIGS. 6-8.

The model updater circuitry 208 compares the classification made by the classifier circuitry 206 to labels provided within the training data 104. The model updater circuitry 208 then uses the comparison to adjust configuration parameters in one or more of the structure analysis circuitry 202, the factor determiner circuitry 204, and the classifier circuitry 206. For example, if the classification made by the classifier circuitry 206 for a particular webpage matches the label in the training data 104, the model updater circuitry 208 may increase a reward function used by a neural network in the classifier circuitry 206. If the classification made by the classifier circuitry 206 for a particular webpage does not match the label in the training data 104, the model updater circuitry 208 may perform actions including but not limited to decreasing a reward function used by the neural network, adding or removing an input from the neural network, changing one or more weights within the neural network, changing how the factor determiner circuitry 204 computes a neural network input value, etc.

When adjusting configuration parameters, the model updater circuitry 208 may also change one or more parameters in the structure analysis circuitry 202 to change the value of the structure similarity score produced for a given pair of webpages. Configuration parameters within the structure analysis circuitry 202 are discussed further in connection with FIG. 4.

The model updater circuitry 208 may test a set of configuration parameters on a group of labelled webpages within the training data 104. If the accuracy rate of the classifier circuitry 206 for the group of labelled webpages satisfies a threshold, the model updater circuitry 208 transmits the set of configuration parameters for storage in the model database 110 via the network 108. In some examples, a set of configuration parameters (which describe how to perform the website structure analysis, how to identify other factors, and how to perform website classification using the foregoing inputs) is referred to as a version of the structural similarity model 106. In some examples, the model updater circuitry 208 is instantiated by programmable circuitry executing model updater instructions and/or configured to perform operations such as those represented by the flowcharts of FIGS. 6-8.

Figure 4:
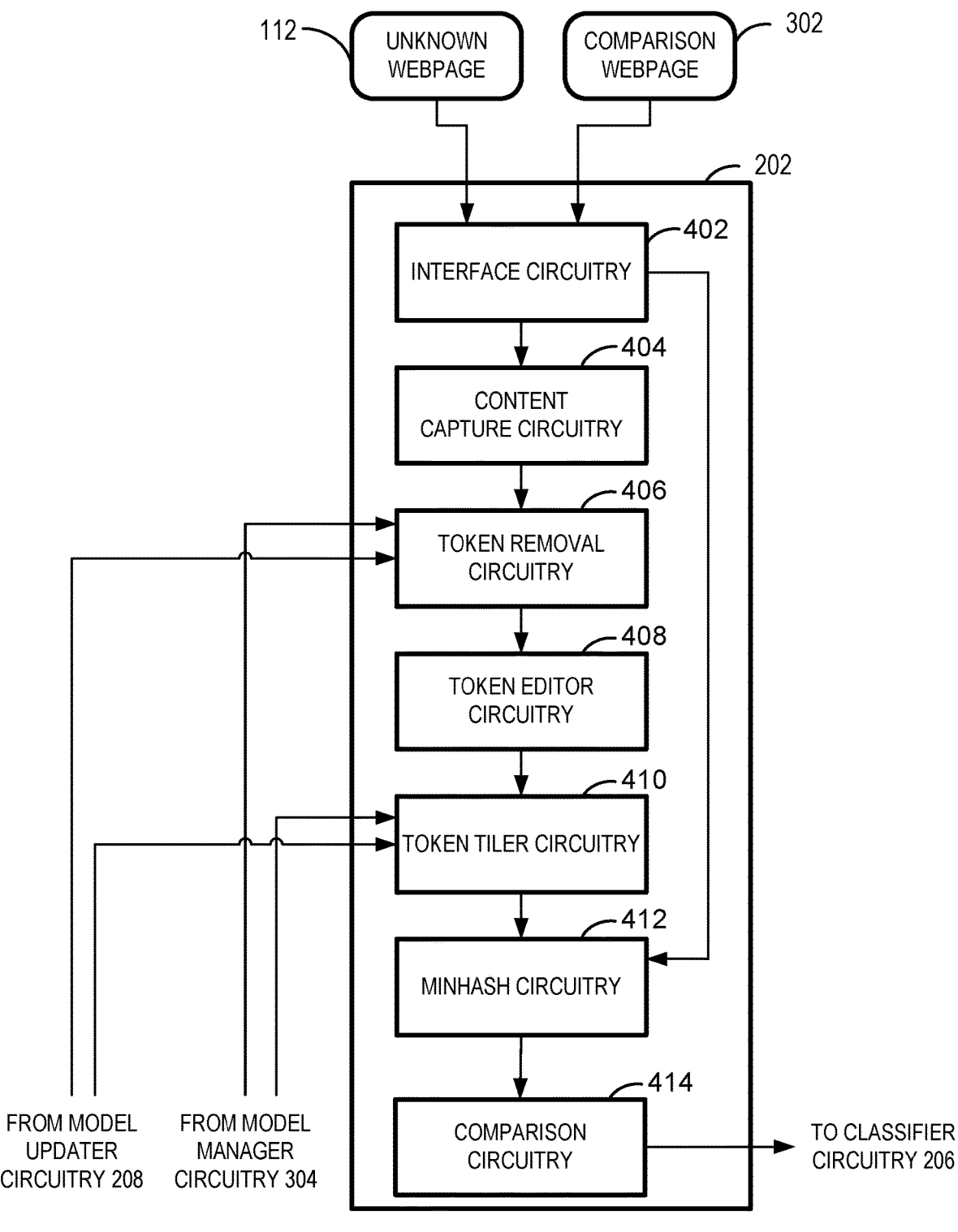
FIG. 4 is a block diagram of an example implementation of the structure analysis circuitry of FIGS. 2 and/or 3.

In some examples, the model trainer circuitry 102 is implemented by a single device. In other examples, one or more of the example block diagram of FIG. 4 shows the structure analysis circuitry 202, the factor determiner circuitry 204, the classifier circuitry 206, and the model updater circuitry 208 are implemented on separate devices that exchange information with one another.

FIG. 3 is a block diagram of an example implementation of the model executor circuitry 114 to classify an unknown webpage as clean or malicious. The model executor circuitry 114 of FIG. 3 may be instantiated (e.g., creating an instance of, bring into being for any length of time, materialize, implement, etc.) by programmable circuitry such as a Central Processor Unit (CPU) executing first instructions. Additionally or alternatively, the model executor circuitry 114 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

In the illustrated example of FIG. 3, the model executor circuitry 114 accesses the unknown webpage 112 and produces the classification 116. The model executor circuitry 114 of FIG. 3 includes the example structure analysis circuitry 202, the example factor determiner circuitry 204, the example classifier circuitry 206, and example model manager circuitry 304.

The structure analysis circuitry 202, factor determiner circuitry 204, and classifier circuitry 206 of FIG. 3 operate as described above in connection with FIG. 2 and in accordance with the teachings of this disclosure. However, in FIG. 2, the structure analysis circuitry 202 receives two webpages from the training data 104. In FIG. 3, the structure analysis circuitry 202 receives the unknown webpage 112 as a first input. The unknown webpage 112 may be hosted by any source, accessed from any device, and is not yet classified as clean or malicious.

The structure analysis circuitry 202 of FIG. 3 receives a comparison webpage 302 as a second input. Accordingly, the structure similarity score of FIG. 3 quantifies the similarity between the unknown webpage 112 and the comparison webpage 302. In some examples, the comparison webpage 302 is part of the training data 104 and, accordingly, is already labelled when received by the model executor circuitry 114. In other examples, the comparison webpage 302 was previously unlabeled and has since been labelled as clean or malicious by the classifier circuitry 206. In still other examples, the comparison webpage 302 is also unlabeled.

In the example of FIG. 3, the comparison webpage 302 is a single webpage. In other examples, the structure analysis circuitry 202 receives a corpus of webpages as a second input. The corpus of webpages may additionally or alternatively be referred to as a group, a set, a plurality, a collection, etc.

When a corpus of webpages is received as a second input, the structure analysis circuitry 202 determines a plurality of structure similarity scores based on comparisons between the unknown webpage 112 and the respective plurality of comparison webpages in the corpus. In such examples, the classifier circuitry 206 may classify the unknown webpage 112 as clean or malicious by executing a nearest neighbor algorithm that uses the plurality of structure similarity scores as inputs. Examples of nearest neighbor algorithms include but are not limited to k-means clustering, locality sensitive hashing (LSH) forest, best bin first, balanced box-decomposition tree, etc. A determination of which nearest neighbor algorithm to use for classification, if any, is an example configuration parameter of the classifier circuitry 206 that is defined within the structural similarity model 106.

The model manager circuitry 304 obtains a version of the structural similarity model 106 from the model database 110. The model manager circuitry 304 then executes the structural similarity model 106 by adjusting the configuration parameters of the structure analysis circuitry 202, the factor determiner circuitry 204, and/or the classifier circuitry 206 based on the model database 110.

The result of the model execution is the classification 116, which labels the unknown webpage 112 as clean or malicious. In some examples, the classification 116 is stored within the model database 110 for use in a future corpus of comparison webpages. The model executor circuitry 114 may additionally or alternatively perform a security operation based on the classification 116, share the classification 116 with an external device, etc. Advantageously, the model manager circuitry 304 enables the classification 116 to be produced using techniques and parameters identified by the model trainer circuitry 102 and defined in the structural similarity model 106. Accordingly, the classification 116 is based (in part or entirely) on one or more structure similarity scores. As such, the classification 116 is more accurate, on average, than malware classification techniques that do not consider the structural similarity between webpages.

FIG. 4 is a block diagram of an example implementation of the structure analysis circuitry 202 of FIGS. 2 and 3 to produce a structure similarity score. The structure analysis circuitry 202 of FIGS. 2 and 3 may be instantiated (e.g., creating an instance of, bring into being for any length of time, materialize, implement, etc.) by programmable circuitry such as a Central Processor Unit (CPU) executing first instructions. Additionally or alternatively, the structure analysis circuitry 202 of FIGS. 2 and 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers. The example of FIG. 4 shows the structure analysis circuitry 202, which includes example interface circuitry 402, example content capture circuitry 404, example token removal circuitry 406, example token editor circuitry 408, example token tiler circuitry 410, example MinHash circuitry 412, and example comparison circuitry 414.

The interface circuitry 402 accesses the unknown webpage 112 and the comparison webpage 302. The interface circuitry 402 may be implemented with any transceivers, antennas, and/or other hardware components required to access webpages via the network 108. The interface circuitry 402 may connect to the model database 110 and/or an external source to access a given webpage. In some examples, the interface circuitry 402 is instantiated by programmable circuitry executing interface instructions and/or configured to perform operations such as those represented by the flowchart(s) of FIGS. 6-8.

In some examples, the structure analysis circuitry 202 includes means for accessing a webpage. For example, the means for accessing may be implemented by interface circuitry 402. In some examples, the interface circuitry 402 may be instantiated by programmable circuitry such as the example programmable circuitry 912 of FIG. 9. For instance, the interface circuitry 402 may be instantiated by the example microprocessor 1000 of FIG. 10 executing machine executable instructions such as those implemented by at least blocks 602 of FIG. 6. In some examples, the interface circuitry 402 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the interface circuitry 402 may be instantiated by any other combination of hardware, software, and/or firmware. For example, the interface circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The content capture circuitry 404 uses the interface circuitry 402 to obtain webpage files. In particular, the content capture circuitry 404 obtains at least a first file corresponding to the unknown webpage 112 and a second file corresponding to the comparison webpage 302. In examples where the model executor circuitry 114 compares the unknown webpage 112 to a corpus of webpages, the content capture circuitry 404 may obtain a file for each webpage in the corpus.

A webpage file may be written in any programming language. In examples described herein, webpages files are written in hypertext markup language (HTML). The content capture circuitry 404 may create or obtain a webpage file in any number of webpage capture techniques. In some examples, the content capture circuitry 404 may obtain the webpage file from a browser application that used the file to display the webpage in a user interface (UI). In some examples, the content capture circuitry 404 may obtain the webpage file using a web scraping technique. In some examples, the content capture circuitry 404 is instantiated by programmable circuitry executing content capture instructions and/or configured to perform operations such as those represented by the flowchart(s) of FIGS. 6-8.

In some examples, the structure analysis circuitry 202 includes means for obtaining a webpage file. For example, the means for obtaining may be implemented by content capture circuitry 404. In some examples, the content capture circuitry 404 may be instantiated by programmable circuitry such as the example programmable circuitry 912 of FIG. 9. For instance, the content capture circuitry 404 may be instantiated by the example microprocessor 1000 of FIG. 10 executing machine executable instructions such as those implemented by at least blocks 602 of FIG. 6. In some examples, the content capture circuitry 404 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the content capture circuitry 404 may be instantiated by any other combination of hardware, software, and/or firmware. For example, the content capture circuitry 404 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

A webpage file can be parsed into units referred to as tokens. For example, in the HTML snippet:

<p> lorem ipsum </p>

<p> is a first token, lorem ipsum is a second token, and </p> is a third token.

Tokens may be sorted into any number of categories based on the data within the token. An example categorization may label a given token as either a content token or a structure token. As used herein, a content token refers to data that is presented on a display when the webpage is viewed in a browser. Content tokens include but are not limited to text tokens (e.g., "lorem ipsum" in the foregoing example), picture tokens, video tokens, etc. In contrast, a structure token refers to data that informs a browser how to organize the content tokens within a UI. Structure tokens include but are not limited to paragraph tokens (e.g., <p> and </p> in the foregoing example), header tokens, bold tokens, italics tokens, etc. In examples described herein, the terms "structure tokens" and "structure determiners" may be used interchangeably. In HTML, structure determiners are referred to as tags. HTML tags indicate the beginning and end of a content token in an HTML document.

The token removal circuitry 406 removes content tokens from webpage files, thereby leaving only structure determiners in the file. As an example, the token removal circuitry 406 may remove content tokens from an HTML file, leaving only tags. The token removal circuitry 406 may remove a content token by deleting the corresponding code from within the webpage file. In some examples, the token removal circuitry 406 is instantiated by programmable circuitry executing tag removal circuitry instructions and/or configured to perform operations such as those represented by the flowchart(s) of FIGS. 6-8. The token removal circuitry 406 is discussed further in connection with FIG. 5A.

The token removal circuitry 406 can adjust which tokens are removed from a web file based on the granularity at which tokens are classified as content or structure. For instance, suppose the unknown webpage 112 displays an image when viewed in a browser. In a first example, the token removal circuitry 406 considers the corresponding image tag, uniform resource indicator (URI) tag, and a type tag to all be structure tokens that remain in the webpage file after content removal. In a second example, the token removal circuitry 406 only considers the corresponding image tag to be a structure token and removes the other tokens considered to be content. The additional data is removed because the second example parsed the unknown webpage 112 a finer granularity/resolution than the first example. The difference in removed data also means that structure similarity score of the first example is different from the structure similarity score.

Advantageously, the granularity at which a webpage is parsed is a configuration parameter that is determined by the model updater circuitry 208 during model training. The configuration parameter is then defined in a version of the structural similarity model 106 and implemented by the model manager circuitry 304 during model execution. Accordingly, when classifying the unknown webpage 112, the token removal circuitry 406 parses the webpage at a granularity that is chosen to increase the probability of accurate classification.

In some examples, the structure analysis circuitry 202 includes means for removing data from a webpage file. For example, the means for removing may be implemented by token removal circuitry 406. In some examples, the token removal circuitry 406 may be instantiated by programmable circuitry such as the example programmable circuitry 912 of FIG. 9. For instance, the token removal circuitry 406 may be instantiated by the example microprocessor 1000 of FIG. 10 executing machine executable instructions such as those implemented by at least blocks 804 of FIG. 8. In some examples, the token removal circuitry 406 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the token removal circuitry 406 may be instantiated by any other combination of hardware, software, and/or firmware. For example, the token removal circuitry 406 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

A structural determiner may include data that is unique to the webpage. For example, the HTML snippet <a href=webpage_domain_URL> is an <a> tag that defines a hyperlink. When parsing HTML webpages, the token removal circuitry 406 may consider all characters within an opening bracket and closing bracket to be part of the same token. Accordingly, the foregoing HMTL snippet can be considered a single structural identifier. Within the structure determiner, webpage_domain_URL refers to the specific webpage that the hyperlink points to.

When comparing two HTML webpages that both include <a> tags, the structure analysis circuitry 202 produces a score that reflects: (a) the fact that both have <a> tags, and (b) where the <a> tags are located relative to other tags. The structure analysis circuitry 202 should not and does not consider where the hyperlinks within the <a> tags point to because such information is not relevant when characterizing the structure of the webpage.

The token editor circuitry 408 normalizes data unique to a webpage within the structure identifiers. Accordingly, the structure similarity score of a webpage that includes the foregoing HTML snippet would not be based on webpage_domain_URL. In some examples, the token editor circuitry 408 is instantiated by programmable circuitry executing token editor instructions and/or configured to perform operations such as those represented by the flowchart(s) of FIGS. 6-8. The token editor circuitry 408 is discussed further in connection with FIG. 5A.

In some examples, the structure analysis circuitry 202 includes means for normalizing data. For example, the means for normalizing may be implemented by token editor circuitry 408. In some examples, the token editor circuitry 408 may be instantiated by programmable circuitry such as the example programmable circuitry 912 of FIG. 9. For instance, the token editor circuitry 408 may be instantiated by the example microprocessor 1000 of FIG. 10 executing machine executable instructions such as those implemented by at least blocks 806 of FIG. 8. In some examples, the token editor circuitry 408 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the token editor circuitry 408 may be instantiated by any other combination of hardware, software, and/or firmware. For example, the token editor circuitry 408 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The token tiler circuitry 410 groups the normalized structure tokens into tiles. A tile refers to one or more adjacent structure determiners within a webpage file. The token tiler circuitry 410 may group the normalized structure tokens into any number of adjacent tiles. Similarly, a given tile in a webpage may have any number of tiles. In some examples, the number of tokens per tile is nonuniform across a given webpage.

Advantageously, the technique by which used by the token tiler circuitry 410 forms tiles can be implemented as one or more configuration parameters that are determined by the model updater circuitry 208 during model training. The configuration parameters are then defined in a version of the structural similarity model 106 and implemented by the model manager circuitry 304 during model execution. Accordingly, when classifying the unknown webpage 112, the token tiler circuitry 410 groups tokens into tiles using a technique that is chosen to increase the probability of accurate classification. In some examples, the token tiler circuitry 410 is instantiated by programmable circuitry executing token tiler instructions and/or configured to perform operations such as those represented by the flowchart(s) of FIGS. 6-8.

In some examples, the structure analysis circuitry 202 includes means for grouping tokens. For example, the means for grouping may be implemented by token tiler circuitry 410. In some examples, the token tiler circuitry 410 may be instantiated by programmable circuitry such as the example programmable circuitry 912 of FIG. 9. For instance, the token tiler circuitry 410 may be instantiated by the example microprocessor 1000 of FIG. 10 executing machine executable instructions such as those implemented by at least blocks 808 of FIG. 8. In some examples, the token tiler circuitry 410 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the token tiler circuitry 410 may be instantiated by any other combination of hardware, software, and/or firmware. For example, the token tiler circuitry 410 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The MinHash circuitry 412 executes a MinHash algorithm using the tiles as inputs. To execute the MinHash algorithm, the MinHash circuitry 412 hashes each tile and finds the Jaccard similarity coefficient between the hashes. The MinHash circuitry 412 may implement such operations using any type of hashing algorithm. In some examples, the MinHash circuitry 412 is instantiated by programmable circuitry executing MinHash instructions and/or configured to perform operations such as those represented by the flowchart(s) of FIGS. 6-8.

In some examples, the structure analysis circuitry 202 includes means for computing a MinHash. For example, the means for computing a MinHash may be implemented by MinHash circuitry 412. In some examples, the MinHash circuitry 412 may be instantiated by programmable circuitry such as the example programmable circuitry 912 of FIG. 9. For instance, the MinHash circuitry 412 may be instantiated by the example microprocessor 1000 of FIG. 10 executing machine executable instructions such as those implemented by at least blocks 810 of FIG. 8. In some examples, the MinHash circuitry 412 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the MinHash circuitry 412 may be instantiated by any other combination of hardware, software, and/or firmware. For example, the MinHash circuitry 412 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The comparison circuitry 414 computes the structural similarity score by comparing the MinHash of the unknown webpage 112 to the MinHash of the comparison webpage 302. The comparison circuitry 414 may determine a structure similarity score using any suitable technique to compare MinHash outputs. In some examples, the comparison circuitry 414 is instantiated by programmable circuitry executing comparison instructions and/or configured to perform operations such as those represented by the flowchart(s) of FIGS. 6-8.

In some examples, the structure analysis circuitry 202 includes means for comparing MinHash outputs. For example, the means for comparing may be implemented by comparison circuitry 414. In some examples, the comparison circuitry 414 may be instantiated by programmable circuitry such as the example programmable circuitry 912 of FIG. 9. For instance, the comparison circuitry 414 may be instantiated by the example microprocessor 1000 of FIG. 10 executing machine executable instructions such as those implemented by at least blocks 812 of FIG. 8. In some examples, the comparison circuitry 414 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the comparison circuitry 414 may be instantiated by any other combination of hardware, software, and/or firmware. For example, the comparison circuitry 414 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 5A:
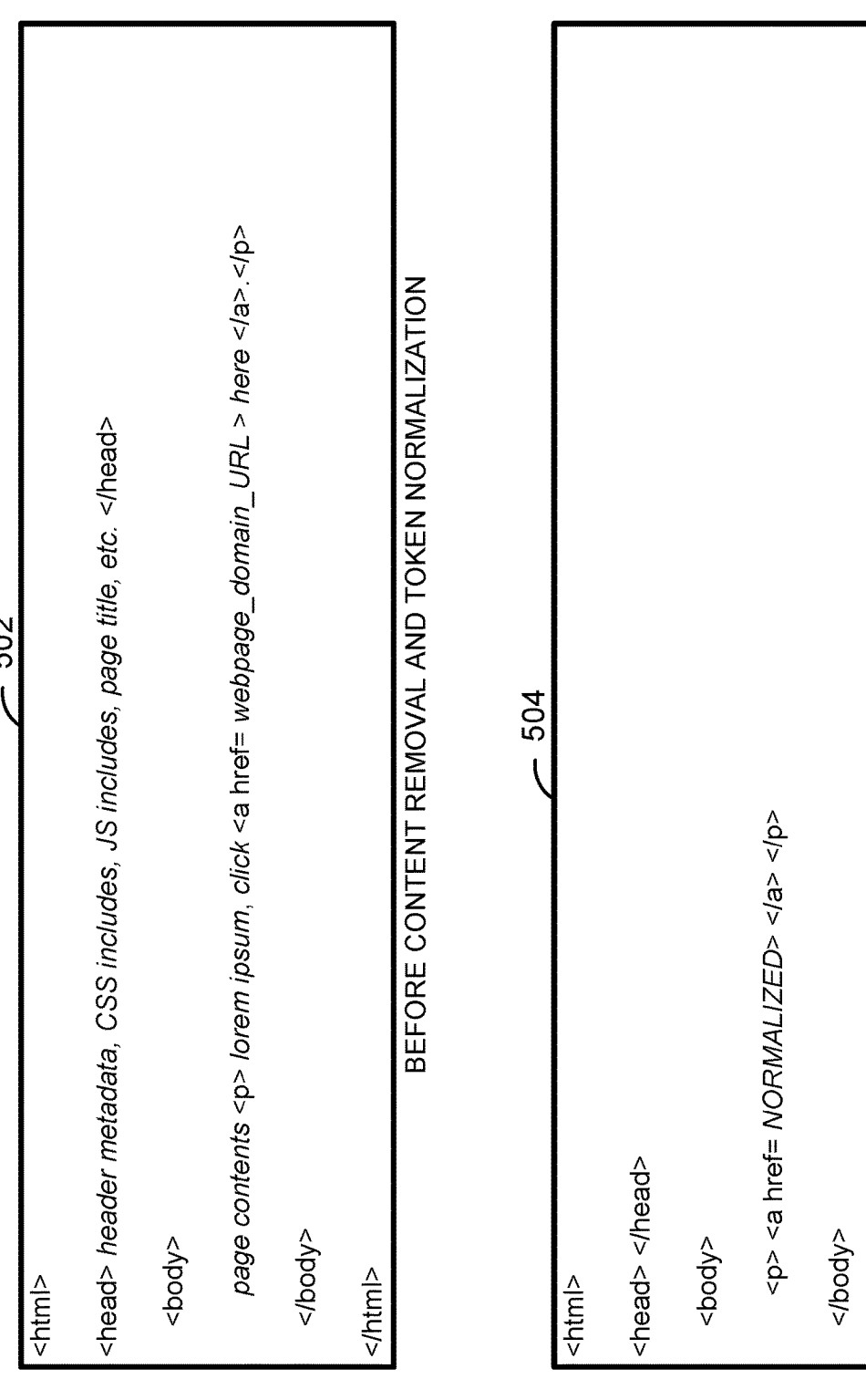
FIG. 5A is an illustrative example of tag removal and normalization as implemented by the structure analysis circuitry of FIGS. 2 and/or 3.

FIG. 5A is an illustrative example of tag removal and normalization as implemented by the structure analysis circuitry of FIGS. 2 and 3. FIG. 5A includes example file 502 and example file 504.

The file 502 is an example output produced by the content capture circuitry 404. That is, the file 502 has not yet been edited by the token removal circuitry 406 or token editor circuitry 408. The file 502 is an HTML file that includes a header, a body, a paragraph, and a hyperlink. The foregoing structural elements of a webpage are represented in the file 502 as HTML tags <head>, </head>, <body>, </body>, <p>, </p>, <a href=webpage_domain_URL>, and </a>, respectively.

The file 502 includes additional text between the HTML tags. For example, text in between the <head> and </head> tags may include but is not limited to header metadata, Cascading Style Sheets (CSS) includes, JavaScript (JS) includes, etc. Additionally, text in between the <body> and </body> tags of the file 502 describes both page contents and additional HTML tags.

The file 504 is an example output produced by the token editor circuitry 408. That is, the file 504 is a version of the file 502 after content removal and token normalization. After receiving the file 502, the token removal circuitry 406 removes content tokens such as header metadata, Cascading Style Sheets (CSS) includes, JavaScript (JS) includes, page contents, the text shown on the hyperlink (e.g., "click here" in FIG. 5A), etc. The token removal circuitry 406 keeps the token <a href=webpage_domain_URL> in the file because it includes structural data (e.g., it indicates a hyperlink).

The token editor circuitry 408 edits the foregoing hyperlink to remove webpage_domain_URL, which is unique to a specific webpage. In the example of FIG. 5A, the token editor circuitry 408 replaces the foregoing text with the word NORMALIZED. In other examples, the token editor circuitry 408 replaces text unique to a webpage with a different placeholder token.

Figure 5B:
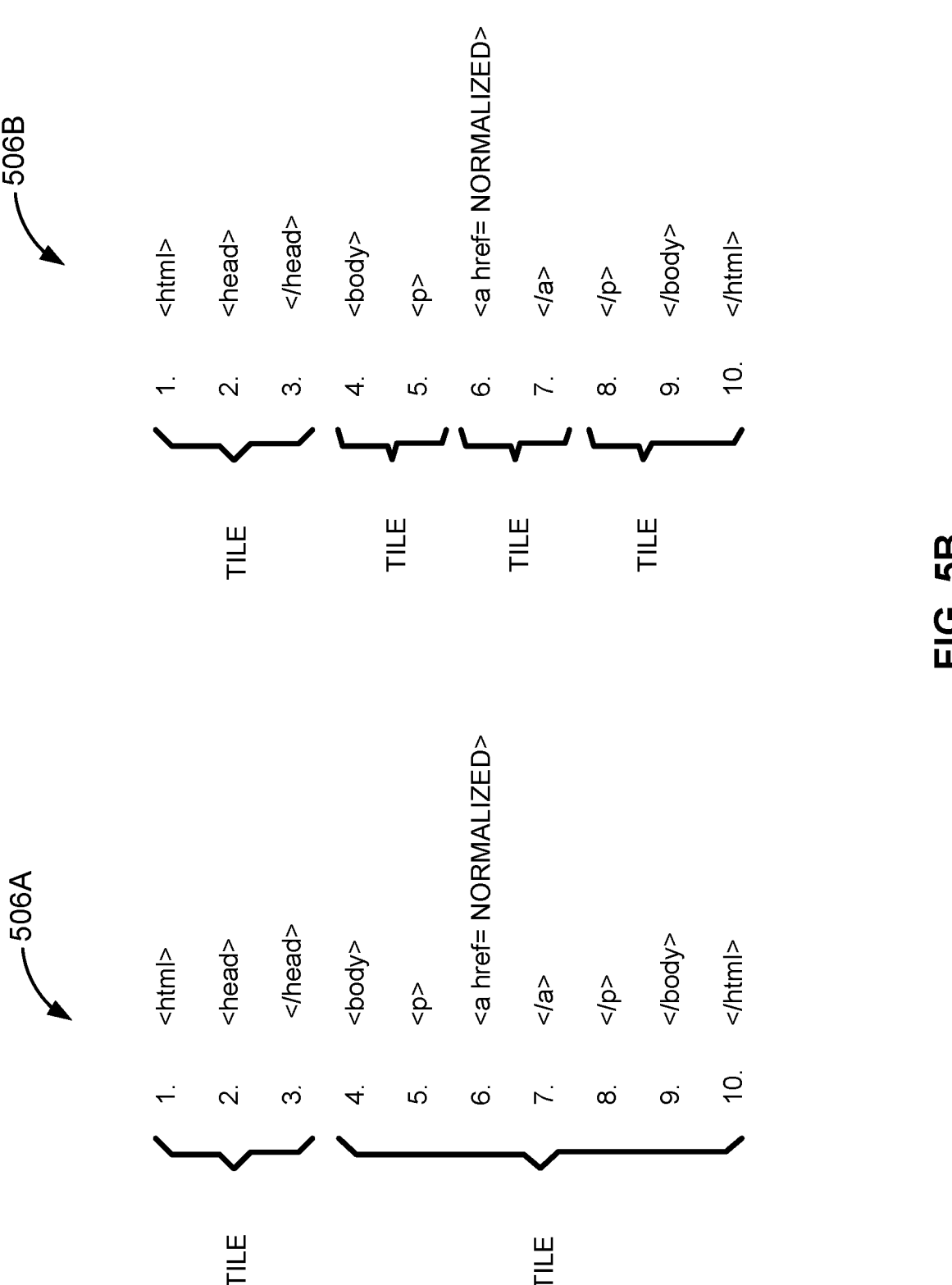
FIG. 5B is an illustrative example of tiling as implemented by the structure analysis circuitry of FIGS. 2 and/or 3.

FIG. 5B is an illustrative example of tiling as implemented by the structure analysis circuitry of FIGS. 2 and 3. In particular, FIG. 5B describes two possible implementations of tiling the file 504 from FIG. 5A. FIG. 5B includes example tiling 506A and example tiling 506B.

FIG. 5B lists represents the file 504 as a numbered list of HTML tags because a tile is a collection of adjacent structure tokens. In the tiling 506A, the token tiler circuitry 410 groups the file 504 into two tiles. A first tile includes tokens numbered 1 through 3 (e.g., the header of the webpage) while a second tile includes tokens numbered 4 through 10 (e.g., the body of the webpage).

In the tiling 506B, the token tiler circuitry 410 groups the file 504 into four tiles. A first tile includes tokens numbered 1 through 3, a second tile includes tokens numbered 4 and 5, a third file includes tokens numbered 6-8, and a fourth file includes tokens 9 through 10. That is, the tiling 506B assigns separate groups to each of: (a) the header, (b) the start of the body and paragraph, (c) the hyperlink, and (d) the end of the paragraph and body.

The structure similarity score produced by the MinHash circuitry 412 will change based on whether the token tiler circuitry 410 uses implements the tiling 506A or the tiling 506B. Advantageously, the tiling technique used by the token tiler circuitry 410 is a configuration parameter that is determined by the model updater circuitry 208 during model training. The configuration parameter is then defined in a version of the structural similarity model 106 and implemented by the model manager circuitry 304 during model execution. Accordingly, when classifying the unknown webpage 112, the token tiler circuitry 410 groups the tiles into tokens using a technique that is chosen to increase the probability of accurate classification.

While an example manner of implementing the model trainer circuitry 102 and model executor circuitry 114 are illustrated in is illustrated in FIGS. 2-4, one or more of the elements, processes, and/or devices illustrated in FIGS. 2-4 may be combined, divided, re-arranged, omitted, eliminated, and/or implemented in any other way. Further, the example structure analysis circuitry 202, example factor determiner circuitry 204, example classifier circuitry 206, and example model updater circuitry 208, model manager circuitry 304, interface circuitry 402, example content capture circuitry 404, example token removal circuitry 406, example token editor circuitry 408, example token tiler circuitry 410, example MinHash circuitry 412, and example comparison circuitry 414, and/or, more generally, the example model trainer circuitry 102 and model executor circuitry 114 of FIGS. 2-4, may be implemented by hardware alone or by hardware in combination with software and/or firmware. Thus, for example, any of the example structure analysis circuitry 202, example factor determiner circuitry 204, example classifier circuitry 206, and example model updater circuitry 208, model manager circuitry 304, interface circuitry 402, example content capture circuitry 404, example token removal circuitry 406, example token editor circuitry 408, example token tiler circuitry 410, example MinHash circuitry 412, and example comparison circuitry 414, and/or, more generally, the example model trainer circuitry 102 and model executor circuitry 114 of FIGS. 2-4, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example model trainer circuitry 102 and model executor circuitry 114 of FIGS. 2-4 may include one or more elements, processes, and/or devices in addition to, or instead of, those illustrated in FIGS. 2-4, and/or may include more than one of any or all of the illustrated elements, processes and devices.

Figure 6:
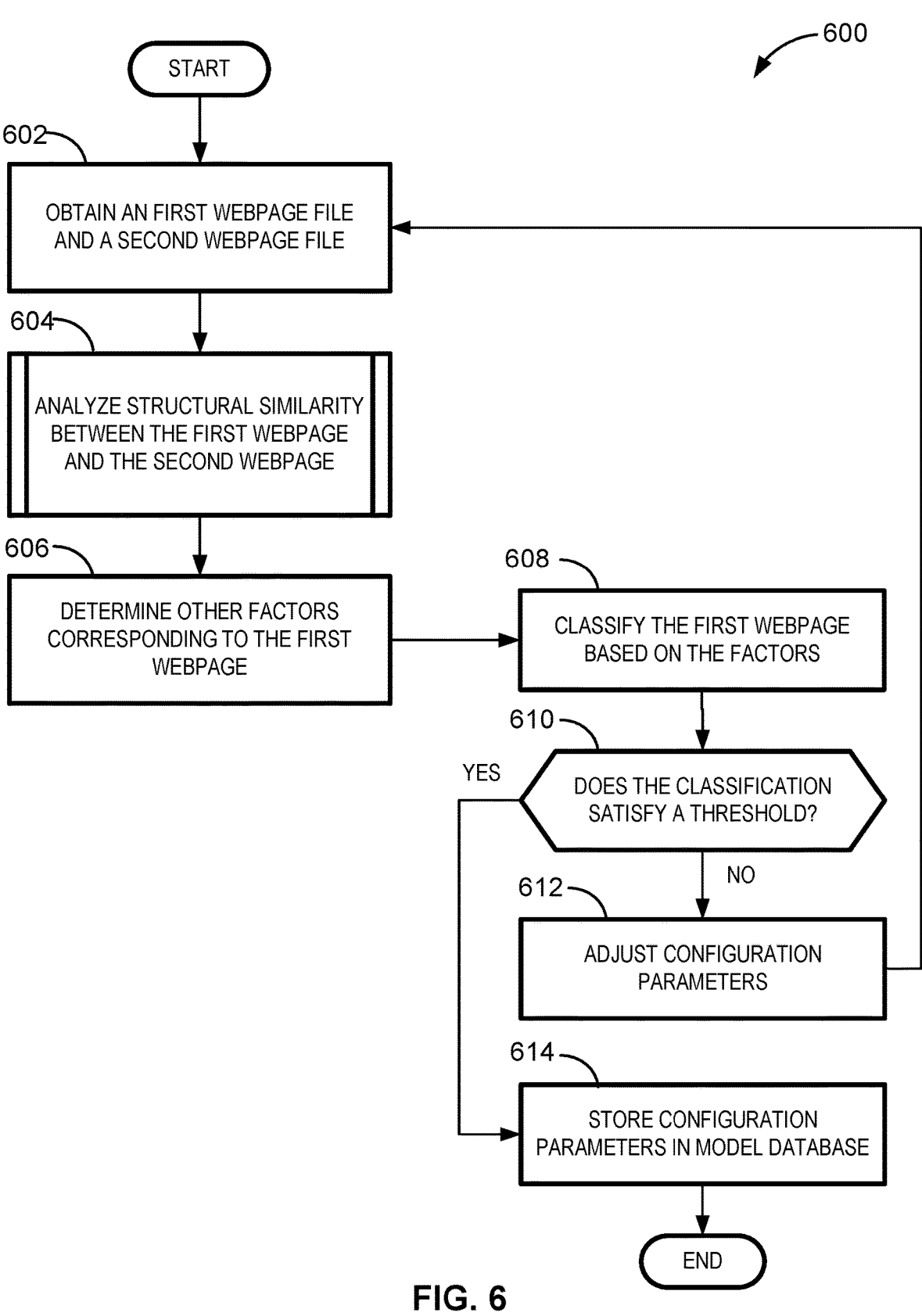
FIG. 6 is a flowchart representative of example machine readable instructions and/or example operations that may be executed, instantiated, and/or performed by example programmable circuitry to implement the model trainer circuitry 102 and model executor circuitry 114 of FIGS. 2-4.
Figure 7:
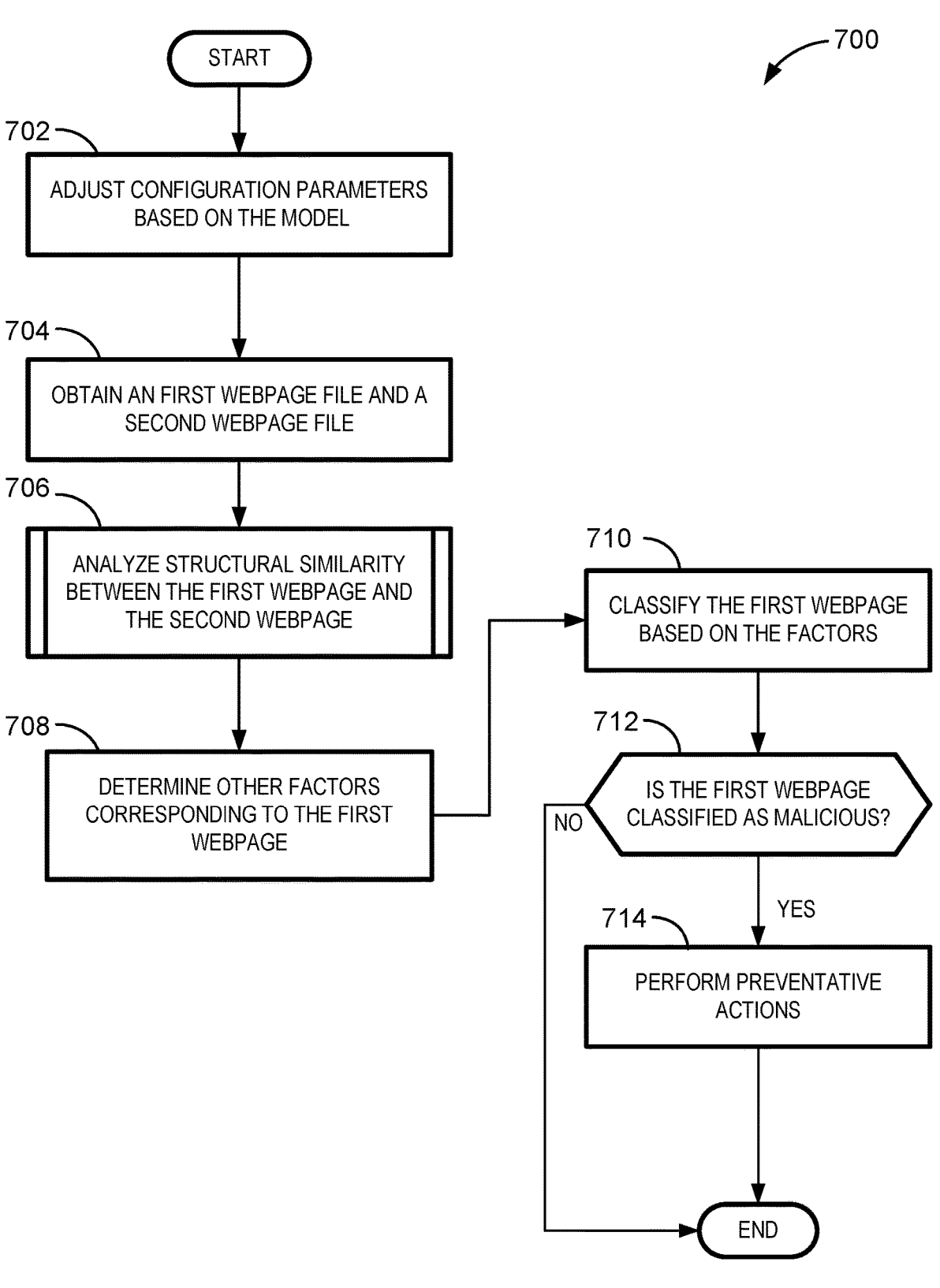
FIG. 7 is a flowchart representative of example machine readable instructions and/or example operations that may be executed, instantiated, and/or performed by example programmable circuitry to implement the model executor circuitry 114 of FIGS. 2-4.
Figure 8:
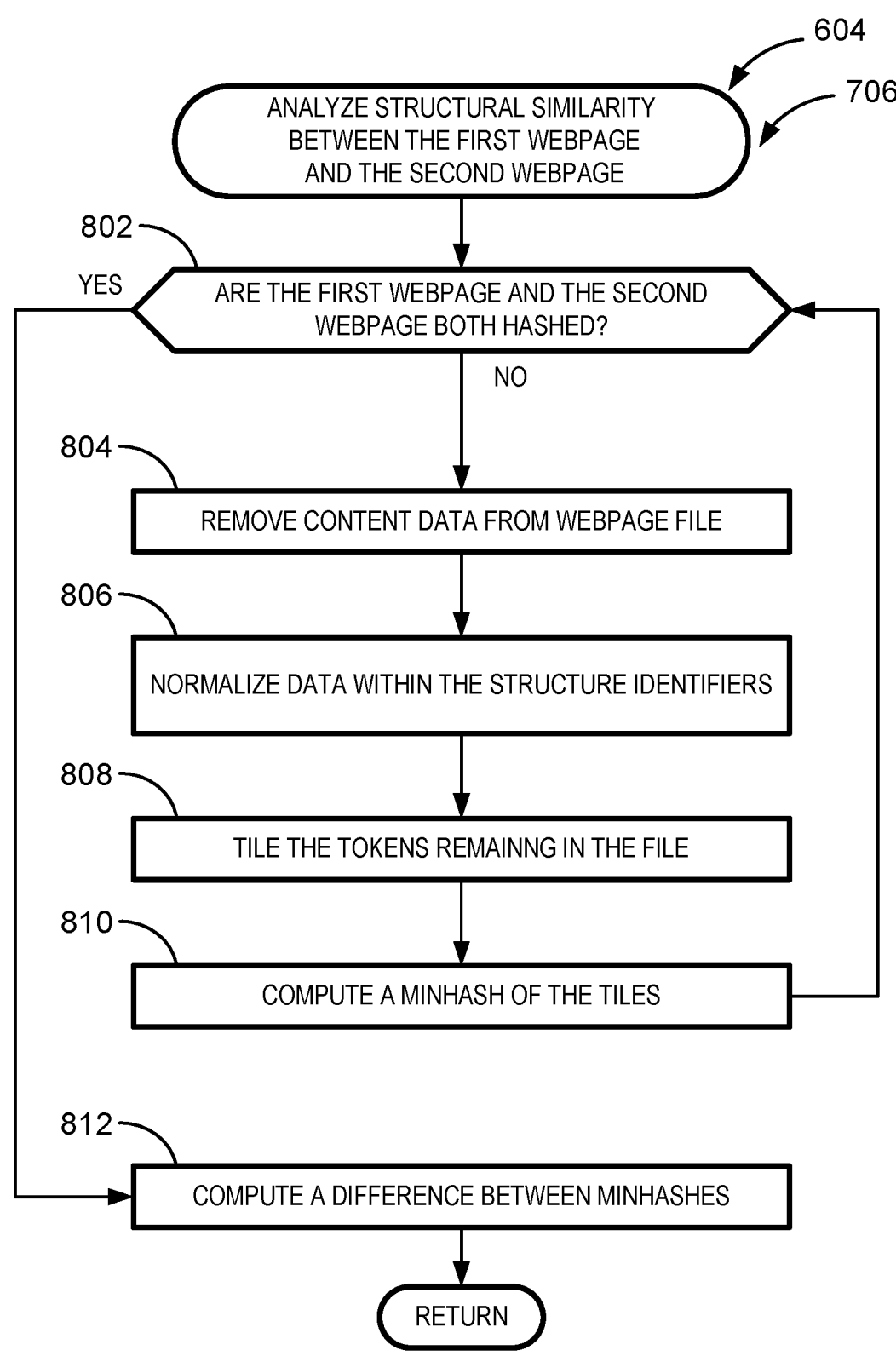
FIG. 8 is a flowchart representative of example machine readable instructions and/or example operations that may be executed, instantiated, and/or performed by example programmable circuitry to analyze the structural similarity between two webpages as described in FIG. 6.

Flowchart(s) representative of example machine readable instructions, which may be executed by programmable circuitry to implement and/or instantiate the model trainer circuitry 102 and model executor circuitry 114 of FIGS. 2-4 and/or representative of example operations which may be performed by programmable circuitry to implement and/or instantiate the model trainer circuitry 102 and model executor circuitry 114 of FIGS. 2-4, are shown in FIGS. 6-8. The machine readable instructions may be one or more executable programs or portion(s) of one or more executable programs for execution by programmable circuitry such as the programmable circuitry 912 shown in the example programmable circuitry platform 900 discussed below in connection with FIG. 9 and/or may be one or more function(s) or portion(s) of functions to be performed by the example programmable circuitry (e.g., an FPGA) discussed below in connection with FIGS. 10 and/or 10. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 6-8, many other methods of implementing the example model trainer circuitry 102 and model executor circuitry 114 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-8 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed, instantiated, and/or performed by programmable circuitry to train and form the structural similarity model 106. The example machine-readable instructions and/or the example operations 600 of FIG. 6 begins when the interface circuitry 402 and the content capture circuitry 404 obtain a first webpage file and a second webpage file. (Block 602). Within the context of the model trainer circuitry 102, both the first webpage and the second webpage are from the labelled training data 104.

The structure analysis circuitry 202 analyzes the structural similarity between the first webpage and the second webpage. (Block 604). In some examples, the structure analysis circuitry 202 produces a structure similarity score to quantify how similar or different the structure of the first webpage is to structure of the second webpage. The structure similarity score can be used as a factor to determine whether a webpage is classified as clean or malicious. Block 604 is discussed further in connection with FIG. 8.

The factor determiner circuitry 204 determines other factors corresponding to the webpage. (Block 606). The classifier circuitry 206 can use any number of factors to perform the malware classification. The additional factors of block 606 can describe any characteristic of the first webpage or computing environment as described above in connection with FIG. 2. During model training, the classifier circuitry 206 may determine how many factors are needed, and which factors are needed, based on configuration parameters set by the model updater circuitry 208.

If no other factors are needed for malware classification (Block 606: No), the classifier circuitry 206 classifies the first webpage as clean or malicious. (Block 608). The classifier circuitry 206 can use any sort of ML technique to perform the classification. In some examples, the classifier circuitry 206 performs the classification by comparing the first webpage to a corpus of webpages (including but not limited to the second webpage) and executing a nearest neighbor algorithm using the plurality of structure similarity scores.

The classifier circuitry 206 classifies the first webpage based, in whole or in part, on the structural analysis of block 606. For example, suppose the second webpage file is labelled as malicious within the training data 104. In such an example, the classifier circuitry 206 is more likely to classify the first webpage as malicious if the structure similarity score is 85%, than if the structure similarity score is 25% (as a higher score indicates the structure of the first webpage is similar to the structure of the malicious second webpage). Similarly, if the second webpage is labelled as clean, the classifier circuitry 206 is more likely to classify the first webpage as clean if the structure similarity score is 85% than if the structure similarity score is 25% (as a higher score now indicates the structure of the first webpage is similar to the structure of a clean webpage). However, in some examples, a comparison between a malicious webpage and a clean webpage results in a high structure similarity score (e.g., if a malicious actor makes a malicious webpage by copying the structure of a legitimate webpage). Advantageously, the classifier circuitry 206 can use any type of ML technique to quantify the relative importance (e.g., the weight) of the structure similarity score and perform the classification accordingly. In some examples, the weight of the structure similarity score changes between classifications based on: (a) the value of the structure similarity score and (b) whether the second webpage is clean, malicious, or unlabeled.

The model updater circuitry 208 determines whether the classification satisfies a threshold. (Block 610). The threshold may be any condition that describes the performance of the structural similarity model 106. Example thresholds include but are not limited to: whether the classification of block 608 matches the labelled classification of the training data, whether the structure similarity score produced in block 604 was within a range of expected values, if the convergence of the classifier circuitry 206 upon a classification occurred using less than a certain amount of time and/or power, etc. While the threshold is described relative to a single webpage classification in the example flowchart of FIG. 6, in other examples, the threshold of block 608 may be based on the classification of multiple webpages.

If the model updater circuitry 208 determines the classification does not satisfy the threshold (Block 610: No), the model updater circuitry 208 adjusts one or more configuration parameters of the structure analysis circuitry 202, the factor determiner circuitry 204, and/or the classifier circuitry 206. (Block 612). The model updater circuitry 208 determines which parameters to adjust, and the amount by which to adjust the selected parameter, through any suitable technique. In some examples, the model updater circuitry 208 makes the foregoing determinations based on the type of threshold, the structure similarity score, and/or the comparison. The model updater circuitry 208 may additionally or alternatively make some or all of the foregoing determinations based on instructions received from an external source. Control returns block 602 after block 612, where the interface circuitry 402 obtains one or more new webpages for classification using the adjusted configuration parameters.

If the model updater circuitry 208 determines the classification does satisfy a threshold (Block 610: Yes), the model updater circuitry 208 saves the configuration parameters in the model database 110 as a version of the structural similarity model 106. (Block 614). The machine readable instructions and/or operations 600 end after block 614.

FIG. 7 is a flowchart representative of example machine readable instructions and/or example operations 700 that may be executed, instantiated, and/or performed by programmable circuitry to execute the structural similarity model 106. The example machine-readable instructions and/or the example operations 700 of FIG. 7 begin when the model manager circuitry 304 adjusts configuration parameters based on a version of the structural similarity model 106. (Block 702). The model manager circuitry 304 may adjust configuration parameters within the structure analysis circuitry 202, the factor determiner circuitry 204, and/or the classifier circuitry 206. Examples of configuration parameters include but are not limited to a token classification or tiling technique of the structure analysis circuitry 202, a type of classification algorithm, a number of inputs to use for the algorithm, the weight (e.g., importance) of the structure similarity score relative to the other inputs, etc.

The model executor circuitry 114 implements blocks 704, 706, 708, and 710 using the same operations as blocks 602-608 and as described above in connection with FIG. 6. Within the context of the model executor circuitry 114, the first webpage is the unknown webpage 112 and the second webpage is the comparison webpage 302.

The model executor circuitry 114 determines whether the classification 116 produced at block 710 is malicious. (Block 712). If the classification 116 of the first webpage is clean (Block 712: No), the machine readable instructions and/or operations 700 end. If the classification 116 of the first webpage is malicious (Block 712: Yes), the model executor circuitry 114 performs one or more preventative actions. (Block 714). Preventative actions refer to any action that mitigates potential harm caused from exposure to the malicious webpage. Preventative actions may include but are not limited to stopping the execution of a particular program, process, or thread, powering off one or more hardware components, setting an interrupt, raising a flag, or generally alerting an operating system, etc. The machine readable instructions and/or operations 700 end after block 714.

FIG. 8 is a flowchart representative of example machine readable instructions and/or example operations that may be executed, instantiated, and/or performed by example programmable circuitry to analyze the structural similarity between two webpages as described in FIG. 6. In particular, the flowchart of FIG. 8 is an example implementation of block 604 of FIG. 6 and of block 706 of FIG. 7.

Implementation of block 604 begins when the structure analysis circuitry 202 determines whether both the first webpage and second webpage are hashed. (Block 802). In some examples, the second webpage is part of a corpus of webpages that is used regularly for comparison with an unknown webpage (e.g., the first webpage). In such examples, the model executor circuitry 114 may execute blocks 804 through 810 once for the second webpage and store the output (e.g. a hash) in the model database 110 so that future comparisons using the second webpage can be made without redundant computation.

If one or both of the first webpage and the second webpage are not hashed (Block 802: No), the token removal circuitry 406 removes content data from a webpage file. (Block 804). The webpage file corresponds to a webpage (e.g., either the first webpage or the first webpage) that has not been hashed. The content data removed from the webpage file may refer to any tokens that do not include structural information as described above.

The token editor circuitry 408 normalizes data within the tokens that remain after content removal (e.g., the structure determiners) (Block 806). To normalize data, the token editor circuitry 408 may replace any text that uniquely identifies a webpage with a placeholder token.

The token tiler circuitry 410 groups the tokens remaining in the file into tiles. (Block 808). The token tiler circuitry 410 determines how to group adjacent tokens into tiles based on configuration parameters set by the model updater circuitry 208 or the model manager circuitry 304.

The MinHash circuitry 412 computes a MinHash of the tiles. (Block 810). As used above and herein, computing a MinHash refers to executing a MinHash algorithm with the tiles as inputs. In some examples, the output of a MinHash algorithm is a matrix of Jaccard similarity values. Control returns to block 802 after block 810, where the structure analysis circuitry 202 redetermines whether both webpages have been hashed.

If the first webpage and the second webpage are both hashed (Block 802: Yes), the comparison circuitry 414 compares a difference between MinHash outputs. (Block 812). In some examples, the comparison circuitry 414 compares the MinHash output of the first webpage to the MinHash output of the second webpage to produce a structure similarity score. The comparison circuitry 414 may perform any number of matrix operations to produce the structure similarity score. The machine readable instructions and/or operations return to block 606 of FIG. 6 after implementing block 812.

Figure 9:
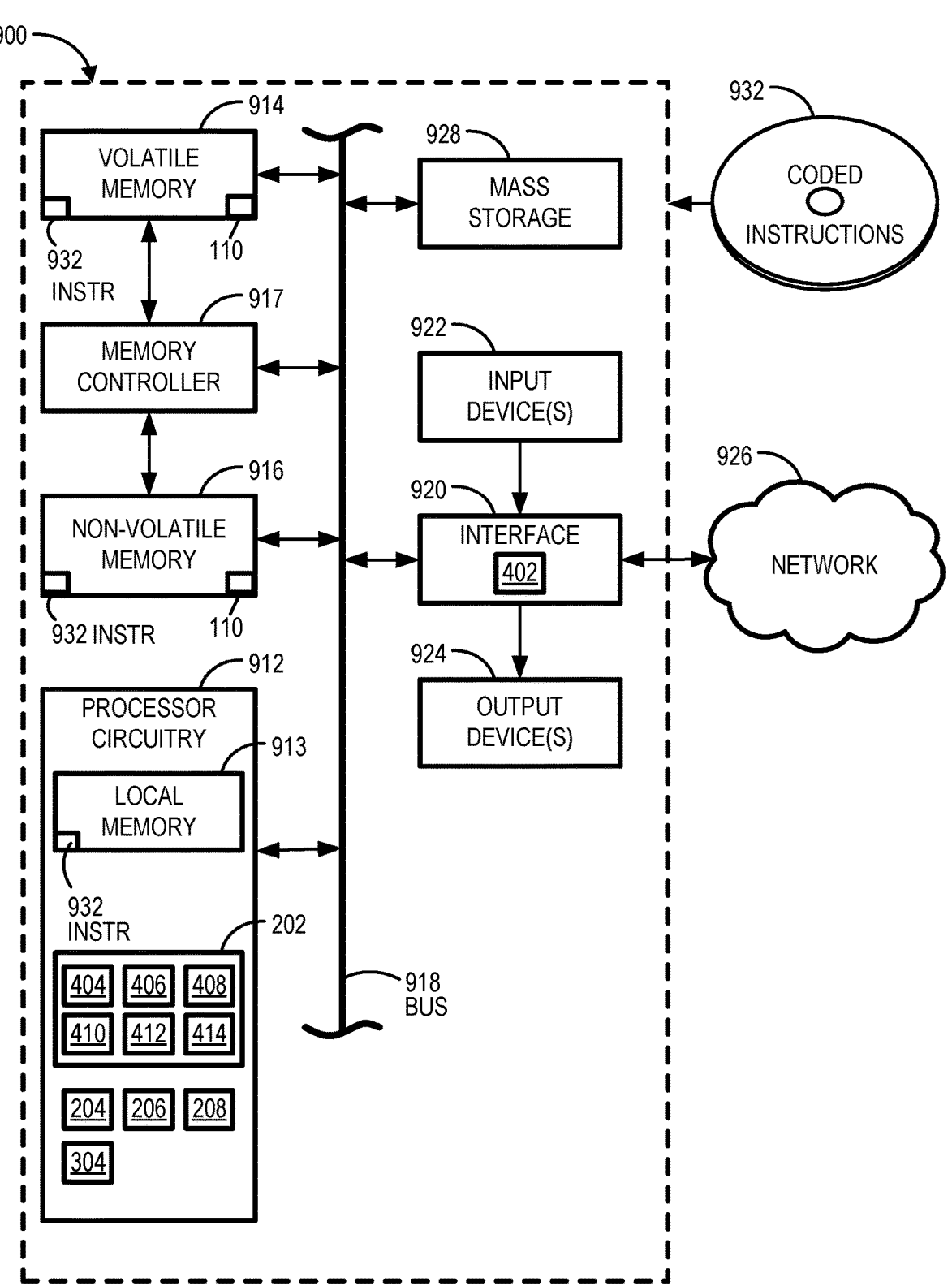
FIG. 9 is a block diagram of an example processing platform including programmable circuitry structured to execute, instantiate, and/or perform the example machine readable instructions and/or perform the example operations of FIGS. 6-8 to implement the model trainer circuitry 102 and model executor circuitry 114 of FIGS. 2-4.

FIG. 9 is a block diagram of an example programmable circuitry platform 900 structured to execute and/or instantiate the example machine-readable instructions and/or the example operations of FIGS. 6-8 to implement the model trainer circuitry 102 and model executor circuitry 114 of FIGS. 2-4. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the example structure analysis circuitry 202, example factor determiner circuitry 204, example classifier circuitry 206, and example model updater circuitry 208, model manager circuitry 304, interface circuitry 402, example content capture circuitry 404, example token removal circuitry 406, example token editor circuitry 408, example token tiler circuitry 410, example MinHash circuitry 412, and example comparison circuitry 414, and/or, more generally, the example model trainer circuitry 102 and/or the model executor circuitry 114.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916. In this example, the main memory 914, 916 implements the model database 110.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 920 implements the interface circuitry 402.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 932, which may be implemented by the machine readable instructions of FIGS. 6-8, may be stored in the mass storage device 928, in the volatile memory 914, in the non-volatile memory 916, and/or on at least one non-transitory computer readable storage medium such as a CD or DVD which may be removable.

Figure 10:
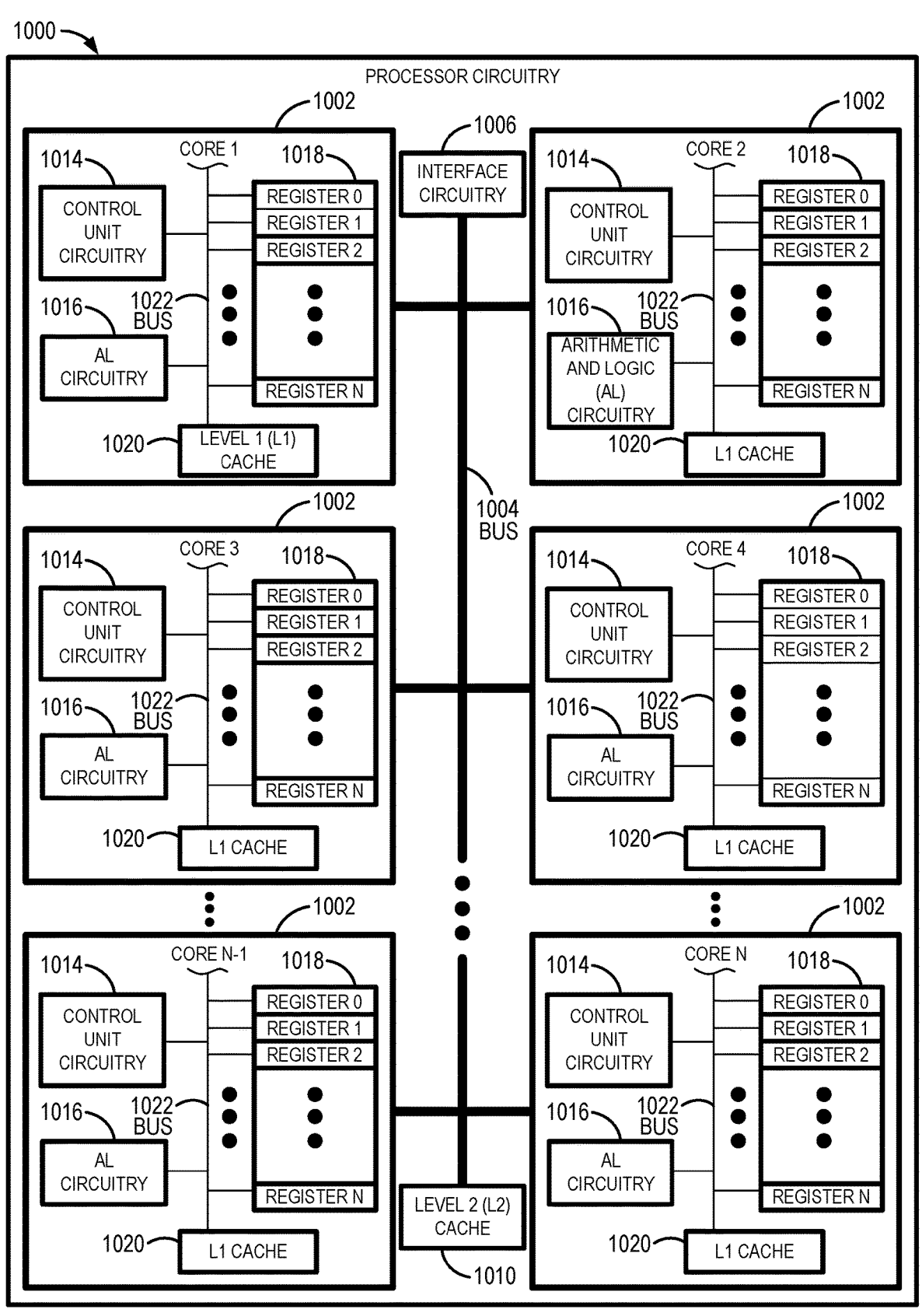
FIG. 10 is a block diagram of an example implementation of the programmable circuitry of FIG. 9.

FIG. 10 is a block diagram of an example implementation of the programmable circuitry 912 of FIG. 9. In this example, the programmable circuitry 912 of FIG. 9 is implemented by a microprocessor 1000. For example, the microprocessor 1000 may be a general-purpose microprocessor (e.g., general-purpose microprocessor circuitry). The microprocessor 1000 executes some or all of the machine-readable instructions of the flowcharts of FIGS. 6-8 to effectively instantiate the circuitry of FIG. 2 as logic circuits to perform operations corresponding to those machine readable instructions. In some such examples, the circuitry of FIGS. 2-4 is instantiated by the hardware circuits of the microprocessor 1000 in combination with the machine-readable instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 6-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating-point operations. In yet other examples, the AL circuitry 1016 may include first AL circuitry that performs integer-based operations and second AL circuitry that performs floating-point operations. In some examples, the AL circuitry 1016 may be referred to as an Arithmetic Logic Unit (ALU).

The registers 1018 are semiconductor-based structures to store data and/or instructions such as results of one or more of the operations performed by the AL circuitry 1016 of the corresponding core 1002. For example, the registers 1018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure, such as by being distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages.

The microprocessor 1000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1000, in the same chip package as the microprocessor 1000 and/or in one or more separate packages from the microprocessor 1000.

Figure 11:
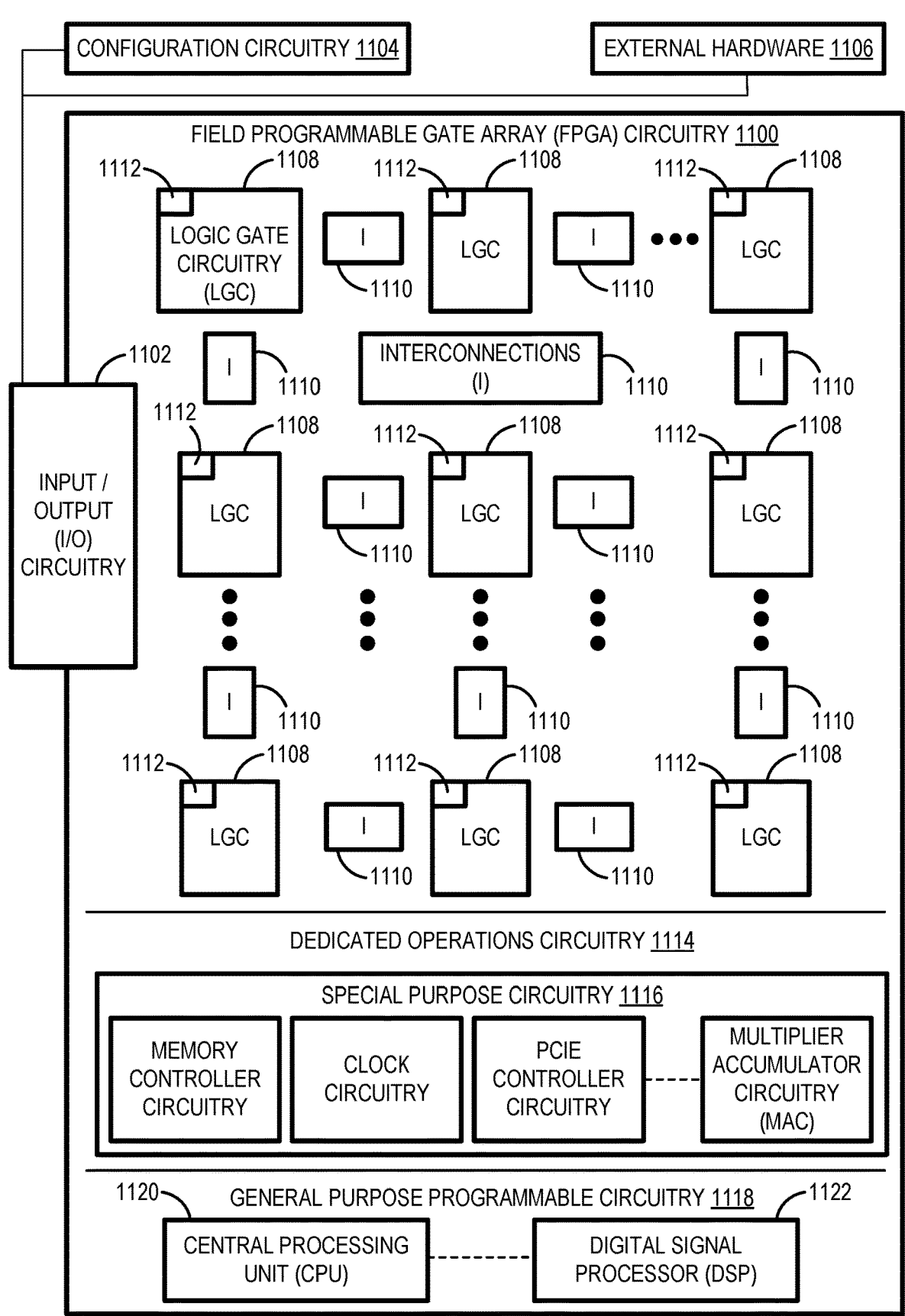
FIG. 11 is a block diagram of another example implementation of the programmable circuitry of FIG. 9.

FIG. 11 is a block diagram of another example implementation of the programmable circuitry 912 of FIG. 9. In this example, the programmable circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1000 of FIG. 10 described above (which is a general purpose device that may be programmed to execute some or all of the machine readable instructions represented by the flowchart(s) of FIGS. 6-8 but whose interconnections and logic circuitry are fixed once fabricated), the FPGA circuitry 1100 of the example of FIG. 11 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 6-8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 6-8. As such, the FPGA circuitry 1100 may be configured and/or structured to effectively instantiate some or all of the operations/functions corresponding to the machine readable instructions of the flowchart(s) of FIGS. 6-8 as dedicated logic circuits to perform the operations/functions corresponding to those software instructions in a dedicated manner analogous to an ASIC. Therefore, the FPGA circuitry 1100 may perform the operations/functions corresponding to the some or all of the machine readable instructions of FIGS. 6-8 faster than the general-purpose microprocessor can execute the same.

In the example of FIG. 11, the FPGA circuitry 1100 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain a binary file, which may be implemented by a bit stream, data, and/or machine-readable instructions, to configure the FPGA circuitry 1100, or portion(s) thereof. In some such examples, the configuration circuitry 1104 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1106 may be implemented by external hardware circuitry. For example, the external hardware 1106 may be implemented by the microprocessor 1000 of FIG. 10.

The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations/functions that may correspond to at least some of the machine readable instructions of FIGS. 6-8 and/or other desired operations. The logic gate circuitry 1108 shown in FIG. 11 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations/functions. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example dedicated operations circuitry 1114. In this example, the dedicated operations circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the programmable circuitry 912 of FIG. 9, many other approaches are contemplated. For example, FPGA circuitry may include an on-board CPU, such as one or more of the example CPU 1120 of FIG. 10. Therefore, the programmable circuitry 912 of FIG. 9 may additionally be implemented by combining at least the example microprocessor 1000 of FIG. 10 and the example FPGA circuitry 1100 of FIG. 11. In some such hybrid examples, one or more cores 1002 of FIG. 10 may execute a first portion of the machine readable instructions represented by the flowchart(s) of FIGS. 6-8 to perform first operation(s)/function(s), the FPGA circuitry 1100 of FIG. 11 may be configured and/or structured to perform second operation(s)/function(s) corresponding to a second portion of the machine readable instructions represented by the flowcharts of FIGS. 6-8, and/or an ASIC may be configured and/or structured to perform third operation(s)/function(s) corresponding to a third portion of the machine readable instructions represented by the flowcharts of FIGS. 6-8.

It should be understood that some or all of the circuitry of FIGS. 2-4 may, thus, be instantiated at the same or different times. For example, same and/or different portion(s) of the microprocessor 1000 of FIG. 10 may be programmed to execute portion(s) of machine-readable instructions at the same and/or different times. In some examples, same and/or different portion(s) of the FPGA circuitry 1100 of FIG. 11 may be configured and/or structured to perform operations/functions corresponding to portion(s) of machine-readable instructions at the same and/or different times.

In some examples, some or all of the circuitry of FIGS. 2-4 may be instantiated, for example, in one or more threads executing concurrently and/or in series. For example, the microprocessor 1000 of FIG. 10 may execute machine readable instructions in one or more threads executing concurrently and/or in series. In some examples, the FPGA circuitry 1100 of FIG. 11 may be configured and/or structured to carry out operations/functions concurrently and/or in series. Moreover, in some examples, some or all of the circuitry of FIGS. 2-4 may be implemented within one or more virtual machines and/or containers executing on the microprocessor 1000 of FIG. 10.

In some examples, the programmable circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the programmable circuitry 912 of FIG. 9, which may be in one or more packages. For example, the XPU may include a CPU (e.g., the microprocessor 1000 of FIG. 10, the CPU 1120 of FIG. 11, etc.) in one package, a DSP (e.g., the DSP 1122 of FIG. 11) in another package, a GPU in yet another package, and an FPGA (e.g., the FPGA circuitry 1100 of FIG. 11) in still yet another package.

Figure 12:
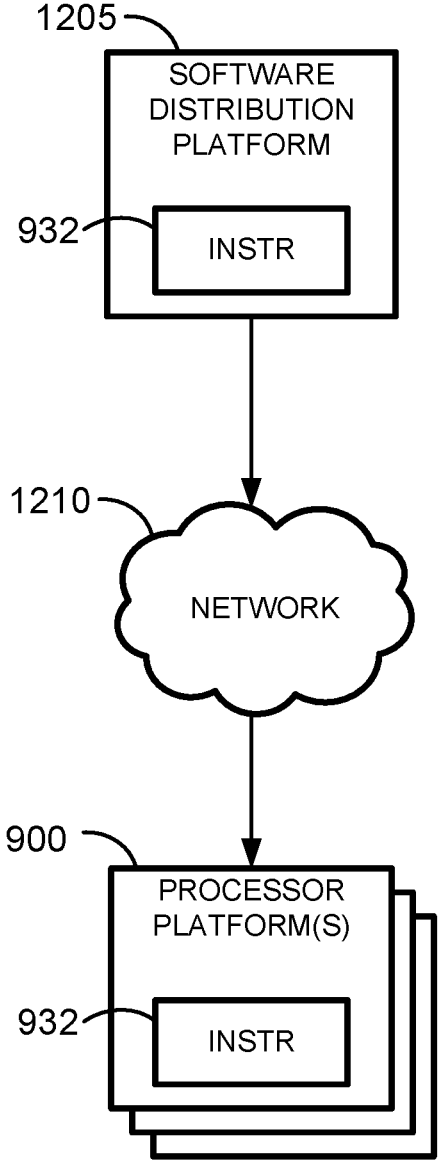
FIG. 12 is a block diagram of an example software/firmware/instructions distribution platform (e.g., one or more servers) to distribute software, instructions, and/or firmware (e.g., corresponding to the example machine readable instructions of FIGS. 6-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to other hardware devices (e.g., hardware devices owned and/or operated by third parties from the owner and/or operator of the software distribution platform) is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions of FIGS. 6-8, as described above. The one or more servers of the example software distribution platform 1205 are in communication with an example network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions of FIGS. 6-8, may be downloaded to the example programmable circuitry platform 900, which is to execute the machine readable instructions 932 to implement the model trainer circuitry 102 and model executor circuitry 114. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed that perform malware classification based on the structural similarity of webpages. Disclosed systems, apparatus, articles of manufacture, and methods improve the efficiency of using a computing device by removing content data from webpage files, normalizing the remaining webpage tokens, tiling the remaining tokens, and using the tiles as inputs to a MinHash algorithm to produce a structure similarity score that can be used to classify webpages as clean or malicious more accurately than classification techniques that do not consider webpage structure. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to identify structural similarity between webpages are disclosed herein. Further examples and combinations thereof include the following.

Example 1 includes an apparatus to identify webpage structure similarity, the apparatus comprising interface circuitry, machine readable instructions, and programmable circuitry to at least one of instantiate or execute the machine readable instructions to remove content data from a file corresponding to a first webpage, the file to include structure determiners after the removal of the content data, normalize data within the structure determiners, group the normalized structure determiners into tiles, compute a first output of a hashing algorithm using the tiles, and compare the first output to a second output of the hashing algorithm to generate a similarity value, the second output corresponding to a second webpage, the similarity value representing a structural similarity between the first webpage and the second webpage.

Example 2 includes the apparatus of example 1, wherein the programmable circuitry is further to classify the first webpage as clean based on a classification of the second webpage, and the similarity value exceeding a similarity threshold, wherein the second webpage represents a clean webpage.

Example 3 includes the apparatus of example 1, wherein to normalize data within the structure determiners, the programmable circuitry is configured to replace a portion of one of the structure determiners with a placeholder token.

Example 4 includes the apparatus of example 3, wherein the portion of the structure determiner replaced by the placeholder token is unique to the first webpage.

Example 5 includes the apparatus of example 1, wherein the first webpage is written in hypertext markup language (HTML), and the structure determiners are HTML tags.

Example 6 includes the apparatus of example 1, wherein to tile the structure determiners, the programmable circuitry is configured to form groups of one or more adjacent structure determiners, the groups based on types and orders of structure determiners within the file.

Example 7 includes the apparatus of example 1, wherein the first output of the hashing algorithm is based on an amount of the content data removed from the file.

Example 8 includes the apparatus of example 1, wherein the programmable circuitry is further to classify the first webpage as malicious based on a classification of the second webpage, and the similarity value exceeding a similarity threshold, wherein the second webpage represents a malicious webpage.

Example 9 includes the apparatus of example 1, wherein the programmable circuitry includes one or more of at least one of a central processor unit, a graphics processor unit, or a digital signal processor, the at least one of the central processor unit, the graphics processor unit, or the digital signal processor having control circuitry to control data movement within the programmable circuitry, arithmetic and logic circuitry to perform one or more first operations corresponding to machine-readable data, and one or more registers to store a result of the one or more first operations, the machine-readable data in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations.

Example 10 includes a non-transitory machine readable storage medium comprising instructions to cause programmable circuitry to at least remove content data from a file corresponding to a first webpage, the file to include structure determiners after the removal of the content data, normalize data within the structure determiners, group the normalized structure determiners into tiles, compute a first output of a hashing algorithm using the tiles, and compare the first output to a second output of the hashing algorithm to generate a similarity value, the second output corresponding to a second webpage, the similarity value representing a structural similarity between the first webpage and the second webpage.

Example 11 includes the non-transitory machine readable storage medium of example 10, wherein the programmable circuitry is further to classify the first webpage as clean based on a classification of the second webpage, and the similarity value exceeding a similarity threshold, wherein the second webpage represents a clean webpage.

Example 12 includes the non-transitory machine readable storage medium of example 10, wherein to normalize data within the structure determiners, the programmable circuitry is configured to replace a portion of one of the structure determiners with a placeholder token.

Example 13 includes the non-transitory machine readable storage medium of example 12, wherein the portion of the structure determiner replaced by the placeholder token is unique to the first webpage.

Example 14 includes the non-transitory machine readable storage medium of example 10, wherein the first webpage is written in hypertext markup language (HTML), and the structure determiners are HTML tags.

Example 15 includes the non-transitory machine readable storage medium of example 10, wherein to tile the structure determiners, the programmable circuitry is configured to form groups of one or more adjacent structure determiners, the groups based on types and orders of structure determiners within the file.

Example 16 includes the non-transitory machine readable storage medium of example 10, wherein the first output of the hashing algorithm is based on an amount of the content data removed from the file.

Example 17 includes the non-transitory machine readable storage medium of example 10, wherein the programmable circuitry is further to classify the first webpage as malicious based on a classification of the second webpage and the similarity value exceeding a threshold, wherein the second webpage represents a malicious webpage.

Example 18 includes a method comprising removing, with programmable circuitry, content data from a file corresponding to a first webpage, the file to include structure determiners after the removal of the content data, normalizing, with programmable circuitry, data within the structure determiners, grouping, with programmable circuitry, the normalized structure determiners into tiles, computing, with programmable circuitry, a first output of a hashing algorithm using the tiles, and comparing, with programmable circuitry, the first output to a second output of the hashing algorithm to generate a similarity value, the second output corresponding to a second webpage, the similarity value representing a structural similarity between the first webpage and the second webpage.

Example 19 includes the method of example 18, wherein to normalize data within the structure determiners, the programmable circuitry is configured to replace a portion of one of the structure determiners with a placeholder token.

Example 20 includes the method of example 19, wherein the portion of the structure determiner replaced by the placeholder token is unique to the first webpage.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to identify webpage structure similarity, the apparatus comprising:
   at least one interface circuit;
   machine readable instructions; and
   at least one programmable circuit to at least one of instantiate or execute the machine readable instructions to:
   remove content data corresponding to a first webpage, the first webpage to include hypertext markup language (HTML) tags after the removal of the content data;
   normalize data within the HTML tags;
   after normalizing, create a linear data structure that organizes the HTML tags based on an order in which the HTML tags appear in the first webpage;
   create tiles from the linear data structure by grouping together one or more HTML tags that are sequentially adjacent to one another within the linear data structure;
   compute a first output of a hashing algorithm using the tiles; and
   compare the first output to a second output of the hashing algorithm to generate a similarity value, the second output corresponding to a second webpage, the similarity value representing a structural similarity between the first webpage and the second webpage.

2. The apparatus of claim 1, wherein the at least one programmable circuit is to classify the first webpage as clean based on a classification of the second webpage, and the similarity value exceeding a similarity threshold, wherein the second webpage represents a clean webpage.

3. The apparatus of claim 1, wherein to normalize data within the HTML tags, the at least one programmable circuit is configured to replace a portion of one of the HTML tags with a placeholder token.

4. The apparatus of claim 3, wherein the portion of the HTML tag replaced by the placeholder token is unique to the first webpage.

5. The apparatus of claim 1, wherein, before removing the content data, the at least one interface circuit is to obtain an HTML file that represents the first webpage.

6. The apparatus of claim 1, wherein the at least one programmable circuit is to form groups of one or more sequentially adjacent HTML tags within the linear data structure based on types and orders of HTML tags within the first webpage.

7. The apparatus of claim 1, wherein the first output of the hashing algorithm is based on an amount of the content data removed from the first webpage.

8. The apparatus of claim 1, wherein the at least one programmable circuit is to classify the first webpage as malicious based on a classification of the second webpage, and the similarity value exceeding a similarity threshold, wherein the second webpage represents a malicious webpage.

9. The apparatus of claim 1, wherein the at least one programmable circuit includes one or more of:

at least one of a central processor unit, a graphics processor unit, or a digital signal processor, the at least one of the central processor unit, the graphics processor unit, or the digital signal processor having control circuitry to control data movement within the at least one programmable circuit, arithmetic and logic circuitry to perform one or more first operations corresponding to machine-readable data, and one or more registers to store a result of the one or more first operations, the machine-readable data in the apparatus;

a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or Application Specific Integrated Circuitry (ASIC) including logic gate circuitry to perform one or more third operations.

10. A non-transitory machine readable storage medium comprising instructions that, when executed by at least one programmable circuit, cause the at least one programmable circuit to at least:

remove content corresponding to a first webpage, the first webpage to include hypertext markup language (HTML) tags after the removal of the content data;

normalize data within the HTML tags;

after normalizing, create a linear data structure that organizes the HTML tags based on an order in which the HTML tags appear in the first webpage;

create tiles from the linear data structure by grouping together one or more HTML tags that are sequentially adjacent to one another within the linear data structure;

compute a first output of a hashing algorithm using the tiles; and compare the first output to a second output of the hashing algorithm to generate a similarity value, the second output corresponding to a second webpage, the similarity value representing a structural similarity between the first webpage and the second webpage.

11. The non-transitory machine readable storage medium of claim 10, wherein the at least one programmable circuit is to classify the first webpage as clean based on a classification of the second webpage, and the similarity value exceeding a similarity threshold, wherein the second webpage represents a clean webpage.

12. The non-transitory machine readable storage medium of claim 10, wherein to normalize data within the HTML tags, the at least one programmable circuit is to replace a portion of one of the HTML tags with a placeholder token.

13. The non-transitory machine readable storage medium of claim 12, wherein the portion of the HTML tag replaced by the placeholder token is unique to the first webpage.

14. The non-transitory machine readable storage medium of claim 10, wherein, before removing the content data, the at least one programmable circuit is to obtain an HTML file that represents the first webpage.

15. The non-transitory machine readable storage medium of claim 10, wherein the at least one programmable circuit is to form groups of one or more sequentially adjacent HTML tags within the linear data structure based on types and orders of HTML tags within the first webpage.

16. The non-transitory machine readable storage medium of claim 10, wherein the first output of the hashing algorithm is based on an amount of the content data removed from the first webpage.

17. The non-transitory machine readable storage medium of claim 10, wherein the at least one programmable circuit is to classify the first webpage as malicious based on a classification of the second webpage, and the similarity value exceeding a similarity threshold, wherein the second webpage represents a malicious webpage.

18. A method comprising:

removing, with at least one programmable circuit, content data corresponding to a first webpage, the first webpage to include hypertext markup language (HTML) tags after the removal of the content data;

normalizing, with the at least one programmable circuit, data within the HTML tags;

after the normalizing, creating a linear data structure that organizes the HTML tags based on an order in which the HTML tags appear in the first webpage;

creating, with the at least one programmable circuit, tiles from the linear data structure by grouping together one or more HTML tags that are sequentially adjacent to one another within the linear data structure;

computing, with the at least one programmable circuit, a first output of a hashing algorithm using the tiles; and comparing, with the at least one programmable circuit, the first output to a second output of the hashing algorithm to generate a similarity value, the second output corresponding to a second webpage, the similarity value representing a structural similarity between the first webpage and the second webpage.

19. The method of claim 18, wherein normalizing data within the HTML tags include replacing, with the at least one programmable circuit, a portion of one of the HTML tags with a placeholder token.

20. The method of claim 19, wherein the portion of the HTML tag replaced by the placeholder token is unique to the first webpage.

* * * * *